United States Patent
Seo et al.

(10) Patent No.: US 12,372,690 B2
(45) Date of Patent: Jul. 29, 2025

(54) LIQUID LENS

(71) Applicants: LG INNOTEK CO., LTD., Seoul (KR); CORNING INCORPORATED, Corning, NY (US)

(72) Inventors: Young Soo Seo, Seoul (KR); Jae Keun Park, Seoul (KR)

(73) Assignees: LG INNOTEK CO., LTD., Seoul (KR); CORNING INCORPORATED, Corning, NY (US)

(*) Notice: Subject to any disclaimer, the term of this patent is extended or adjusted under 35 U.S.C. 154(b) by 438 days.

(21) Appl. No.: 17/615,296

(22) PCT Filed: Apr. 6, 2020

(86) PCT No.: PCT/KR2020/004641
§ 371 (c)(1),
(2) Date: Nov. 30, 2021

(87) PCT Pub. No.: WO2020/242039
PCT Pub. Date: Dec. 3, 2020

(65) Prior Publication Data
US 2022/0196964 A1     Jun. 23, 2022

(30) Foreign Application Priority Data
May 31, 2019  (KR) .................. 10-2019-0064205
Jun. 18, 2019  (KR) .................. 10-2019-0072234

(51) Int. Cl.
*G02B 3/12* (2006.01)
*G02B 3/14* (2006.01)
(Continued)

(52) U.S. Cl.
CPC .............. *G02B 7/028* (2013.01); *G02B 3/12* (2013.01); *G02B 3/14* (2013.01); *H04N 23/50* (2023.01)

(58) Field of Classification Search
CPC .................................. G20B 3/12; G20B 3/14
(Continued)

(56) References Cited

U.S. PATENT DOCUMENTS 5,074,629 A * 12/1991 Zdeblick .................. G02B 3/14
                                                                    251/11
7,088,917 B2 * 8/2006 Butterworth ............. G02B 3/14
                                                                    396/89
(Continued)

FOREIGN PATENT DOCUMENTS

JP       2012-98718 A      5/2012
KR   10-2007-0001423 A     1/2007
(Continued)

OTHER PUBLICATIONS

June-Kyoo Lee, Kyung-Woo Park, Geun-Bae Lim, Hak-Rin Kim, and Seong-Ho Kong, "Variable-focus Liquid Lens Based on a Laterally-integrated Thermopneumatic Actuator," J. Opt. Soc. Korea 16, 22-28 (2012) (Year: 2012).*
(Continued)

*Primary Examiner* — Zachary W Wilkes
(74) *Attorney, Agent, or Firm* — Birch, Stewart, Kolasch & Birch, LLP

(57) ABSTRACT

The present embodiment relates to a liquid lens comprising: a case forming a chamber therein; a liquid disposed in the chamber; and a heating member disposed in the case and heating the liquid, wherein the case comprises: a first plate through which an optical axis passes, and disposed on one side of the liquid; and a second plate through which the optical axis passes, and disposed on the other side of the liquid, the thickness of the first plate on the optical axis is thinner than that of the second plate on the optical axis, and the chamber is filled with a single liquid.

17 Claims, 18 Drawing Sheets

(51) Int. Cl.
*G02B 7/02* (2021.01)
*H04N 23/50* (2023.01)

(58) Field of Classification Search
USPC .................................. 359/665, 666
See application file for complete search history.

(56) References Cited

U.S. PATENT DOCUMENTS

| | | | |
|---|---|---|---|
| 7,359,124 B1* | 4/2008 | Fang | G02B 3/14 |
| | | | 359/666 |
| 8,092,892 B2* | 1/2012 | Keppner | G02B 3/12 |
| | | | 428/68 |
| 8,649,104 B2* | 2/2014 | Koga | G02B 3/14 |
| | | | 359/666 |
| 8,837,054 B2* | 9/2014 | Li | G02B 3/14 |
| | | | 359/666 |
| 11,474,284 B2* | 10/2022 | Kaminski | G02B 3/0006 |
| 2005/0265715 A1* | 12/2005 | Butterworth | G02B 3/14 |
| | | | 396/506 |
| 2009/0116118 A1* | 5/2009 | Frazier | G02B 3/14 |
| | | | 359/666 |
| 2009/0246546 A1* | 10/2009 | Keppner | B29C 41/02 |
| | | | 385/141 |
| 2012/0105971 A1 | 5/2012 | Lee et al. | |
| 2013/0321929 A1 | 12/2013 | Li et al. | |
| 2019/0346593 A1 | 11/2019 | Lee et al. | |
| 2019/0377152 A1 | 12/2019 | Park | |
| 2019/0384137 A1 | 12/2019 | Lee et al. | |
| 2020/0004104 A1 | 1/2020 | Park | |
| 2020/0096679 A1* | 3/2020 | Kaminski | G02B 26/004 |

FOREIGN PATENT DOCUMENTS

| | | |
|---|---|---|
| KR | 10-2009-0058498 A | 6/2009 |
| KR | 10-2018-0081935 A | 7/2018 |
| KR | 10-2018-0087079 A | 8/2018 |
| KR | 10-2018-0087082 A | 8/2018 |
| KR | 10-2018-0088204 A | 8/2018 |
| KR | 10-2018-0093566 A | 8/2018 |
| KR | 10-2018-0094615 A | 8/2018 |
| WO | WO 2018/148283 A1 | 8/2018 |
| WO | WO-2018187591 A2 * 10/2018 ......... G02B 13/0075 |  |

OTHER PUBLICATIONS

Wei Zhang, Khaled Aljasem, Hans Zappe, and Andreas Seifert, "Completely integrated, thermo-pneumatically tunable microlens," Opt. Express 19, 2347-2362 (2011) (Year: 2011).*

* cited by examiner (a)

(b)

(a)

(b)

(a)

(b)

(a)

(b)

LIQUID LENS

CROSS REFERENCE TO RELATED APPLICATIONS

This application is the National Phase of PCT/KR2020/004641 filed on Apr. 6, 2020, which claims priority under 35 U.S.C. § 119(a) to Patent Application Nos. 10-2019-0064205 and 10-2019-0072234 filed in the Republic of Korea on May 31, 2019 and Jun. 18, 2019, respectively, all of which are hereby expressly incorporated by reference into the present application.

TECHNICAL FIELD

This embodiment relates to a liquid lens.

BACKGROUND ART

Users of portable devices want optical devices that have high resolution, are small in size, and have various photographing functions. For example, various photographing functions may mean at least one of an optical zoom function (zoom-in/zoom-out), an auto-focusing (AF) function, or a handshake correction or image stabilization (OIS) function. In the conventional case, in order to implement the above-described various photographing functions, a method in which several lenses are combined and the combined lenses are directly moved has been used. However, when the number of lenses is increased in this way, the size of an optical device may be increased.

The autofocus and handshake correction functions are performed by moving or tilting several lenses aligned with the optical axis in an optical axis or a vertical direction of the optical axis. At this time, there is a problem in that performance is deteriorated due to thermal expansion of a lens unit performing autofocusing and different liquids performing the handshake correction function in the optical device.

In addition, there are studies on liquid lenses that perform autofocus by electrically controlling the curvature of the interface between two liquids, but liquid lenses that use two liquids have disadvantages in that there are many parts to manage, such as adjusting the amount of the two liquids and the like, making the manufacturing process difficult and difficult to control, and being much subjected to ambient influences such as temperature and the like, thereby requiring a new specialized control unit.

DETAILED DESCRIPTION OF THE INVENTION

Technical Subject

A first embodiment of the present invention is to provide a liquid lens having improved optical performance despite a temperature change, a lens assembly comprising the lens, and a camera module comprising the assembly.

A second embodiment of the present invention is to provide a liquid lens driven by a single liquid.

A second embodiment of the present invention is to provide a liquid lens that does not require a specialized control unit since the manufacturing process is simplified and only current control is required.

A second embodiment of the present invention is to provide a liquid lens that controls temperature by using the characteristics of a liquid lens that is difficult to control according to temperature.

Technical Solution

A liquid lens according to a first embodiment of the present invention comprises: a first plate comprising a cavity in which a first liquid and a second liquid different from each other are disposed; a second plate disposed at one place either above and below the first plate; and a third plate disposed at the other place either above and below the first plate, wherein the second plate comprises: a first portion in contact with the first liquid and having a first thickness; and a second portion surrounding the first portion and coupled to the first plate and having a second thickness greater than the first thickness, and wherein a third thickness of a portion of the third plate facing the second liquid may be greater than or equal to the first thickness and smaller than the second thickness.

For example, the first portion of the second plate may comprise a flat portion having the first thickness uniformly and an elastic portion surrounding the flat portion.

For example, the elastic portion may be disposed between the flat portion and the second portion, and may have greater elasticity than the flat portion.

For example, the first thickness and the third thickness may be the same as each other.

For example, the flat portion may be connected to the elastic portion so as to move in parallel to move away from or closer to the cavity according to the expansion and contraction of the elastic portion.

For example, the elastic portion may have an annular planar shape.

For example, the elastic portion may comprise at least one first segment having a fourth thickness smaller than the first thickness; a second segment disposed between the first segment and the flat portion; and a third segment disposed between the first segment and the second portion.

For example, at least one of the second and third segments may have a cross-sectional shape whose thickness decreases as it approaches the first segment.

For example, the at least one first segment may comprise a plurality of first segments, and the elastic portion may comprise a fourth segment disposed between the plurality of first segments.

For example, the fourth segment may have a cross-sectional shape whose thickness decreases as it approaches the first segment.

For example, the elastic portion may comprise at least one of a recess and a protruding portion, and each of the recess and the protruding portion may have a cross-sectional shape of at least one among a semicircle, a semi-ellipse, and a polygon.

For example, among the first opening and the second opening respectively formed above and below the first plate, the second opening may be smaller, and the width of the flat portion may be greater than the width of the second opening.

For example, the second portion of the second plate may comprise a bonding area that is coupled to the first plate through a soft bonding method.

For example, at least one of an inner edge or an outer edge of the bonding area may have a polygonal bottom shape.

For example, the liquid lens may comprise an adhesive disposed between the second portion of the second plate and the first plate.

For example, the thermal expansion coefficient of the adhesive may be greater than the thermal expansion coefficient of the first portion of the second plate.

A lens assembly according to another embodiment may comprise the liquid lens; and at least one lens aligned with the liquid lens in an optical axis.

For example, the at least one lens may comprise a plurality of lenses, and the liquid lens may be disposed at least one place among a place between the plurality of lenses, above the plurality of lenses, and below the plurality of lenses.

A camera module according to another embodiment comprises the lens assembly; and an image sensor that receives the light passing through the liquid lens and the at least one lens to generate image data, and is aligned with the optical axis.

A liquid lens according to a second embodiment of the present invention comprises: a case forming a chamber therein; a liquid disposed in the chamber; and a heating member disposed on the case and heating the liquid, wherein the case comprises a first plate through which an optical axis passes and disposed on one side of the liquid, and a second plate through which the optical axis passes and disposed on the other side of the liquid, wherein a thickness of the first plate along the optical axis is thinner than a thickness of the second plate along the optical axis, and wherein the chamber may be filled with a single liquid.

The first plate may be deformed according to the temperature of the liquid.

The first plate may swell when the liquid is heated.

The first plate comprises a first portion through which the optical axis passes and a second portion extending from an outer circumference of the first portion, wherein the thickness along the optical axis of the first portion may be smaller than a thickness along the corresponding direction of the second portion.

The thickness along the optical axis of the first plate may be 40 to 80 μm.

The case comprises a third plate disposed between the first plate and the second plate, the heating member is disposed along the surface of the third plate, the heating member comprises a first terminal and a second terminal being exposed to the outside, and at least a portion of the heating member may be disposed between the first plate and the third plate.

An inner circumferential surface of the third plate may comprise an inclined surface whose diameter increases as it approaches the first plate from a lower end being disposed on the second plate, and a portion of the heat generating member may be disposed along the inclined surface.

A sensor disposed in the case and sensing the temperature of the liquid is comprised, and the sensor may comprise a third terminal and a fourth terminal being exposed to the outside.

The second plate and the third plate may be integrally formed.

A liquid lens according to a second embodiment of the present invention comprises: a case forming a chamber therein; a liquid disposed in the chamber; and a heating member heating the liquid, wherein the case comprises a plate through which an optical axis passes, the plate is deformed according to the temperature, and the chamber may be filled with a single liquid.

Advantageous Effects

A liquid lens, a lens assembly comprising the lens, and a camera module comprising the assembly can minimize the effect of the thermal expansion of a first liquid and a second liquid on a second plate at various temperatures or high temperatures by implementing the third thickness of the third plate to be similar to or equivalent to the first thickness of the second plate, or by implementing the second plate to have an elastic portion, or by implementing one of the outer edge or inner edge of the bonding area to have a polygonal planar shape, or by coupling a first plate and a second plate with an adhesive instead of soft bonding, thereby minimizing the deformation of the second plate of the liquid lens and enabling the improvement of the optical performance.

In addition, the effects obtainable in the first embodiment of the present invention are not limited to the above-mentioned effects, and another effect not mentioned will be clearly understood by those of ordinary skill in the art to which the present invention belongs from the following description.

The second embodiment of the present invention helps to strengthen cost competitiveness by simplifying the constituent materials and the number of processes.

In addition, it may be designed to be usable at a high temperature of 80 degrees or more.

In addition, ultrasonic waves can be used in the manufacturing process.

In addition, the structure of a camera device can be simplified by reducing the number of terminals.

BEST MODE

Figure 1:
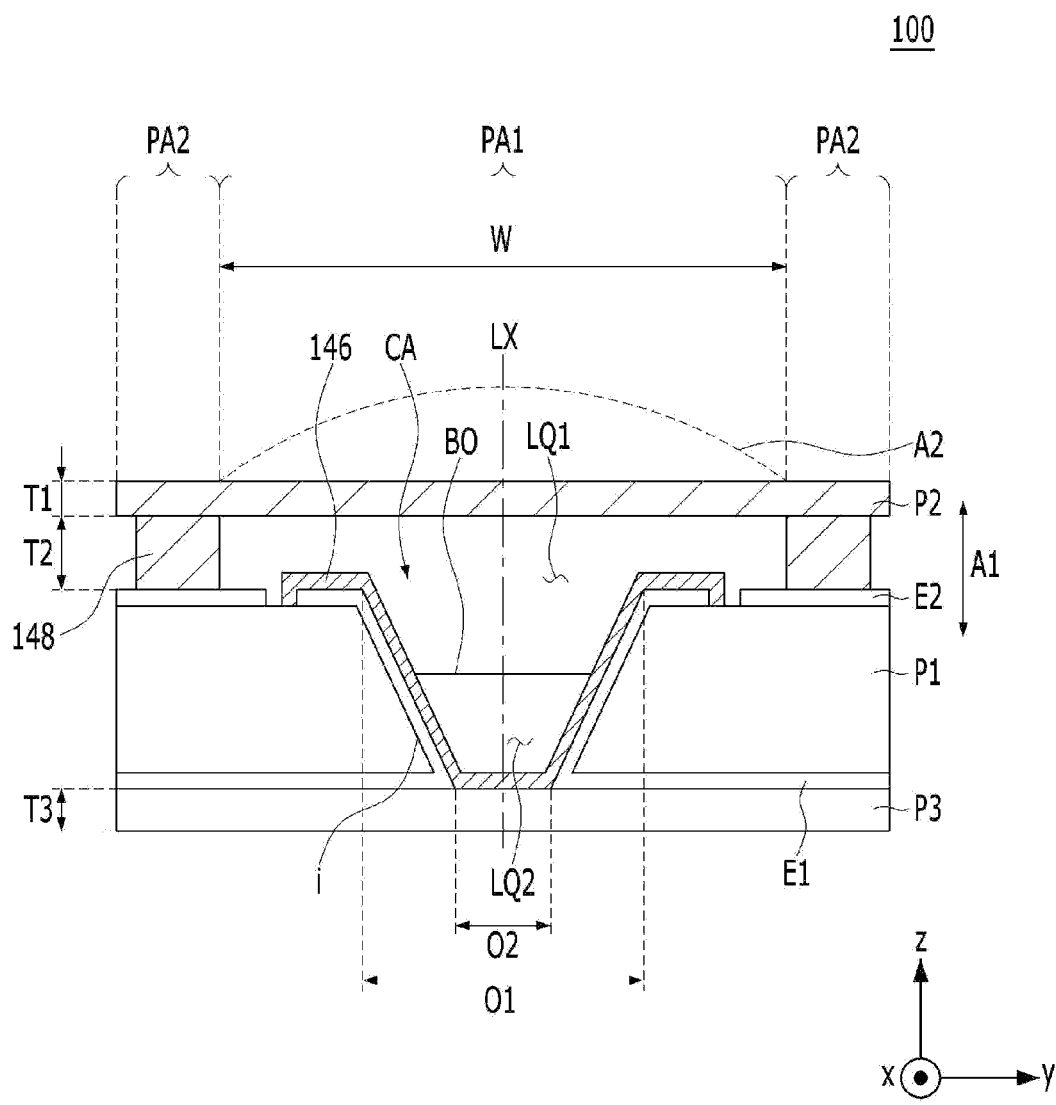
FIG. 1 shows a cross-sectional view of a liquid lens according to a first embodiment of the present invention.

Hereinafter, preferred embodiments of the present invention will be described in detail with reference to the accompanying drawings.

However, the technical idea of the present invention is not limited to some embodiments to be described, but may be implemented in various forms, and within the scope of the technical idea of the present invention, one or more of the constituent elements may be selectively combined or substituted between embodiments.

In addition, the terms (comprising technical and scientific terms) used in the embodiments of the present invention, unless explicitly defined and described, can be interpreted as a meaning that can be generally understood by a person skilled in the art, and commonly used terms such as terms defined in the dictionary may be interpreted in consideration of the meaning of the context of the related technology.

In addition, terms used in the present specification are for describing embodiments and are not intended to limit the present invention.

In the present specification, the singular form may comprise the plural form unless specifically stated in the phrase, and when described as "at least one (or more than one) of A and B and C", it may comprise one or more of all combinations that can be combined with A, B, and C.

In addition, in describing the components of the embodiment of the present invention, terms such as first, second, A, B, (a), and (b) may be used. These terms are merely intended to distinguish the components from other components, and the terms do not limit the nature, order or sequence of the components.

And, when a component is described as being 'connected', 'coupled' or 'interconnected' to another component, the component is not only directly connected, coupled or interconnected to the other component, but may also comprise cases of being 'connected', 'coupled', or 'interconnected' due that another component between that other components.

In addition, when described as being formed or arranged in "on (above)" or "below (under)" of each component, "on (above)" or "below (under)" means that it comprises not only the case where the two components are directly in contact with, but also the case where one or more other components are formed or arranged between the two components. In addition, when expressed as "on (above)" or "below (under)", the meaning of not only an upward direction but also a downward direction based on one component may be comprised.

A variable lens may be a variable focus lens. Also, the variable lens may be a lens whose focus is adjusted. The variable lens may be at least one among a liquid lens, a polymer lens, a liquid crystal lens, a VCM type, and an SMA type. The liquid lens may comprise a liquid lens containing one liquid and a liquid lens containing two liquids. A liquid lens comprising one liquid may change the focus by adjusting a membrane disposed at a position corresponding to the liquid, for example, by pressing the membrane by electromagnetic force of a magnet and a coil to variably adjust the focus. A liquid lens comprising two liquids may control an interface between a conductive liquid and a non-conductive liquid by using a voltage applied to the liquid lens comprising the conductive liquid and the non-conductive liquid. A polymer lens may variably adjust the focus of a polymer material through a driving unit such as a piezo. A liquid crystal lens may variably adjust the focus by controlling the liquid crystal by electromagnetic force. A VCM type can variably adjust the focus by controlling a solid lens or a lens assembly comprising a solid lens through electromagnetic force between a magnet and a coil. In a SMA type, a focus can be variably adjusted by controlling a solid lens or a lens assembly comprising a solid lens by using a shape memory alloy.

Hereinafter, a liquid lens according to an embodiment, a lens assembly comprising the lens, and a camera module comprising the assembly will be described using a Cartesian coordinate system, but the embodiment is not limited thereto. That is, according to the Cartesian coordinate system, the x-axis, the y-axis, and the z-axis are orthogonal to one another, but the embodiment is not limited thereto. That is, the x-axis, y-axis, and z-axis may intersect each other instead of being orthogonal.

Figure 2:
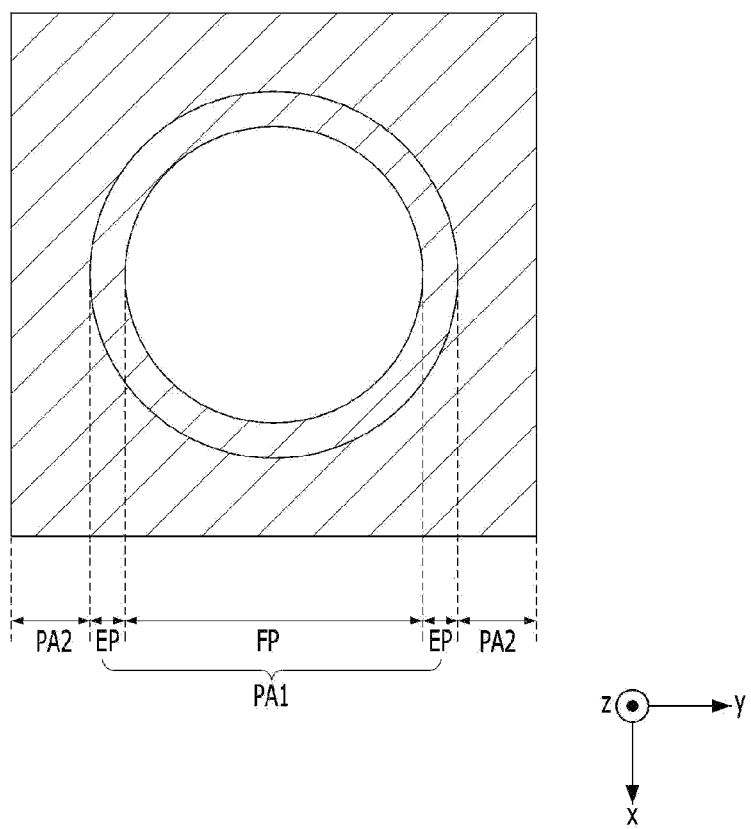
FIG. 2 shows a plan view of the liquid lens illustrated in FIG. 1.

FIG. 1 shows a cross-sectional view of a liquid lens 100 according to a first embodiment of the present invention, and FIG. 2 shows a plan view of the liquid lens 100 illustrated in FIG. 1.

Referring to FIGS. 1 and 2, the liquid lens 100 according to the first embodiment of the present invention may comprise first and second liquids LQ1 and LQ2 that are different from each other, first to third plates P1 to P3, first and second electrodes E1 and E2, and an insulation layer 146.

A plurality of first and second liquids LQ1 and LQ2 may comprise a first liquid LQ1 having conductivity and a second liquid LQ2 having non-conductivity that are filled, accommodated, or disposed inside a cavity CA. The first liquid LQ1 and the second liquid LQ2 do not mix with each other, and an interface BO may be formed at a portion in contact between the first and second liquids LQ1 and LQ2. For example, the first liquid LQ1 may be disposed above the second liquid LQ2, but the embodiment is not limited thereto. According to another embodiment, the second liquid LQ2 may be disposed on the first liquid LQ1.

The first plate P1 may comprise a cavity CA. The inner side surface i of the first plate P1 may define a side portion of the cavity CA. At this time, the inner side surface i of the first plate P1 may be inclined as illustrated, but the embodiment is not limited thereto.

The cavity CA may comprise first and second openings O1 and O2 respectively formed above and below the first plate P1. That is, the cavity CA may be defined as a region surrounded by the inner side surface i of the first plate P1, the first opening O1, and the second opening O2. The diameter of the wider opening among the first and second openings O1 and O2 may vary depending on a field of view FOV required for the liquid lens 100 or a role to be performed in an optical device comprising the liquid lens 100. According to a first embodiment of the present invention, the size (or area or width) of the first opening O1 may be larger than the size (or area or width) of the second opening O2. Here, the size of each of the first and second openings O1 and O2 may be a cross-sectional area in a horizontal direction (e.g., an x-axis and a y-axis direction). For example, the size of each of the first and second openings O1 and O2 may mean a radius when the cross-section of the opening is circular, and may mean a diagonal length when the cross-section of the opening is square.

A cavity CA is a portion through which light passes. Accordingly, the first plate P1 constituting the cavity CA may be made of a transparent material, or may comprise impurities to prevent light from being easily transmitted.

A light may be incident through the first opening O1 that is wider than the second opening O2 in the cavity CA and emitted through the second opening O2, and it may be incident through the second opening O2 that is narrower than the first opening O1 and may be emitted through the first opening O1.

In addition, the second plate P2 may be disposed at one place above or below the first plate P1, and the third plate P3 may be disposed at one place above or below the first plate P1. For example, as illustrated, the second plate P2 may be disposed above the first plate P1, and the third plate P3 may be disposed below the first plate P1. In this case, the second plate P2 may be disposed above the cavity CA, and the third plate P3 may be disposed below the cavity CA.

The second plate P2 and the third plate P3 may be disposed to face each other with the first plate P1 interposed therebetween. Also, at least one of the second plate P2 and the third plate P3 may be omitted.

At least one of the second or third plates P2 and P3 may have a rectangular planar shape, and a partial region may be escaped to expose a portion of an electrode which will be described later. Each of the second and third plates P2 and P3 is a region through which light passes, and may be made of a light-transmitting material. For example, each of the second and third plates P2 and P3 may be made of glass, and may be made of the same material for convenience of the process. In addition, the edges of each of the second and third plates P2 and P3 may have a rectangular shape, but is not limited thereto.

The second plate P2 may have a configuration that allows an incident light to travel into the cavity CA of the first plate P1, but may also have a configuration that allows a light emitted in the opposite direction. The third plate P3 may have a configuration that allows light passing through the cavity CA of the first plate P1 to be emitted, but also have a configuration that allows light emitted in the opposite direction. The second plate P2 may be in direct contact with the first liquid LQ1.

In addition, the actual effective lens area of the liquid lens 100 may be narrower than the diameter of the narrow second opening O2 among the first and second openings O1 and O2 of the first plate P1.

Meanwhile, a first electrode (or individual electrode) E1 is disposed on one surface of the first plate P1 (e.g., below the first plate P1), and a second electrode (or the common electrode) E2 may be disposed on the other surface of the first plate P1 (e.g., above the first plate P1).

A portion of the second electrode E2 disposed above the first plate P1 may be exposed to the conductive first liquid LQ1 to directly contact the first liquid LQ1. On the other hand, an insulation layer 146 is disposed between the first electrode E1 and the first and second liquids LQ1 and LQ2, so that the first electrode E1 and the first and second liquids LQ1 and LQ2 may be electrically isolated from each other.

The first electrode E1 may be a plurality of electrodes, and the second electrode E2 may be a single electrode. For example, the number of the first electrodes E1 may be four or eight, and the embodiment is not limited to a specific number of the first electrodes E1.

In addition, the first electrode E1 may be disposed to be extended from between the first and third plates P1 and P3 to the inner side surface i of the first plate P1.

In addition, the first electrode E1 is extended from the inner side surface i of the first plate P1 to the above of the first plate P1 and may be disposed to be spaced apart from the second electrode E2.

Each of the first electrode E1 and the second electrode E2 may be made of a conductive material, for example, a metal.

Meanwhile, the insulation layer 146 may be disposed while covering a portion of the upper surface of the third plate P3 in a lower region of the cavity CA. That is, the insulation layer 146 may be disposed between the second liquid LQ2 and the third plate P3.

In addition, the insulation layer 146 may be disposed while covering the entire first electrode E1 disposed on the inner side surface i of the cavity CA. In addition, the insulation layer 146 may be disposed on the upper surface of the first plate P1 while covering a portion of the second electrode E2 and the whole of the first electrode E1. As such, the insulation layer 146 can block the contact between the first electrode E1 and the first liquid LQ1, contact between the first electrode E1 and the second liquid LQ2, and contact between the third plate P3 and the second liquid LQ2.

The insulation layer 146 covers the first electrode E1 and exposes a portion of the second electrode E2 so that electrical energy is applied to the first liquid LQ1 having conductivity through the second electrode E2.

Meanwhile, the liquid lens module comprising the liquid lens 100 according to the first embodiment of the present invention may comprise a first connection substrate (e.g., 141 in FIG. 12 which will be described later) and a second connection substrate (e.g., 144 of FIG. 12 which will be described later).

The first connection substrate 141 may be electrically connected to an electrode pad formed on the main substrate (e.g., 230 of FIG. 12 which will be described later) through a connection pad electrically connected to the first electrode E1. The second connection substrate 144 may be electrically connected to an electrode pad formed on the main substrate 230 through a connection pad electrically connected to the second electrode E2.

For example, the first connection board 141 may be implemented as a flexible printed circuit board (FPCB), and the second connection board 144 may be implemented as an FPCB or a single metal substrate (conductive metal plate), but the embodiment is not limited thereto.

The first connection substrate 141 may transmit a plurality of different voltages (hereinafter, referred to as 'individual voltages') to the plurality of first electrodes E1, respectively. The second connection substrate 144 may transmit one driving voltage (hereinafter, referred to as a 'common voltage') to the second electrode E2. The common voltage may comprise a DC voltage or an AC voltage, and when the common voltage is applied in the form of a pulse, the width or duty cycle of the pulse may be constant. That is, a driving voltage may be supplied to the liquid lens 100 through the first connection substrate 141 and the second connection substrate 144.

The curvature of the interface BO formed inside the liquid lens 100 may change in response to the driving voltage to perform an auto-focusing (AF) function, and the tilting angle of the interface BO may be changed to perform the function of handshake correction or optical image stabilization (OIS).

Hereinafter, the liquid lens according to the first embodiment of the present invention will be described in detail as follows.

Referring to FIGS. 1 and 2, the second plate P2 may comprise first and second portions PA1 and PA2.

The first portion PA1 is a portion in contact with the first liquid LQ1, and the second portion PA2 is a portion surrounding the first portion PAL The second plate P2 may have a first thickness T1 that is uniform.

In addition, the lens 100 illustrated in FIG. 1 may further comprise a bonding member 148. The bonding member (or adhesive) 148 is disposed between the first plate P1 and the second plate P2 and plays the role of coupling the first plate P1 and the second plate P2 to each other.

Alternatively, the lens 100 illustrated in FIG. 1 may further comprise a plate leg 148 instead of the bonding member 148. The plate leg 148 is disposed between the first plate P1 and the second plate P2 and plays the role of supporting the second plate P2. Here, the plate leg 148 may be integrally implemented with the same material as the second plate P2. The member 148 may have a second thickness T2.

A thickness (hereinafter, referred to as a 'third thickness') T3 of a portion of the third plate P3 facing the second liquid LQ2 is equal to or greater than the first thickness T1, and may be smaller than the sum of the first thickness T1 and the second thickness T2. Or, the third thickness T3 may be greater than the first thickness T1. For example, the first thickness T1 and the third thickness T3 may be equal to each other.

The first and second liquids LQ1 and LQ2 may be expanded in an optical axis direction (e.g., a z-axis direction) by the heat generated when the liquid lens 100 according to the above-described embodiment operates or by the temperature around the liquid lens 100. At this time, if the third thickness T3 of the third plate P3 is thick and the first thickness T1 of the second plate P2 is relatively thin, stress due to thermal expansion is concentrated on the second plate P2, causing a lot of bending in the second plate P2, and thus optical performance may deteriorate.

However, as described above, the first thickness T1 of the second plate P2 and the third thickness T3 of the third plate P3 are the same, or when the third thickness T3 is smaller than the sum of the first thickness T1 and the second thickness T2 and slightly larger than the first thickness T1, stress due to thermal expansion of the first and second liquids LQ1 and LQ2 may be distributed to the first and third plates P1 and P3. As such, when the stress is dispersed, the probability of damaging the second plate P2 is reduced, and the optical performance of the liquid lens 100 is not deteriorated and can be maintained well.

Meanwhile, the first portion PA1 of the second plate P2 may have a flat portion FP and an elastic portion EP.

The flat portion FP may have a uniform first thickness T1 and may be positioned on a path through which an optical axis LX passes in the second plate P2.

As illustrated in FIG. 2, the elastic portion EP surrounds the flat portion FP and may be disposed between the flat portion FP and the second portion PA2.

The elastic portion EP may have greater elasticity than the flat portion FP. When the elastic portion EP has greater elasticity than the flat portion FP, when the first and second liquids LQ1 and LQ2 thermally expand, the stress may be concentrated on the elastic portion EP than the flat portion FP. To this end, the flat portion FP may be connected to the elastic portion EP so as to move away from or close to the cavity CA according to the expansion and contraction of the elastic portion EP.

When the first portion PA1 of the second plate P2 is curved (230 in FIG. 13a which will be described later) by thermal expansion of the first and second liquids LQ1 and LQ2, the performance of the liquid lens 100 may deteriorate. However, as in the embodiment, when the flat portion FP moves in parallel, it is not affected or less affected by the thermal expansion of the first and second liquids LQ1 and LQ2, so that the performance of the liquid lens 100 can be maintained.

When the width W of the flat portion FP is smaller than the width of the second opening O2, one of both ends of the flat portion FP may be deflected and the like, and due to this, parallel movement of the flat portion FP may become difficult when the liquid LQ1 and LQ2 expand. Accordingly, the width W of the flat portion FP may be greater than the width of the second opening O2 or greater than or equal to the width of the second opening O2, but the embodiment is not limited thereto.

As illustrated in FIG. 2, the elastic portion EP may have an annular planar shape, but the embodiment is not limited to a specific planar shape of the elastic portion EP. That is, the elastic portion EP may have a round ring shape when the liquid lens 100 is viewed from above.

Figure 3A:
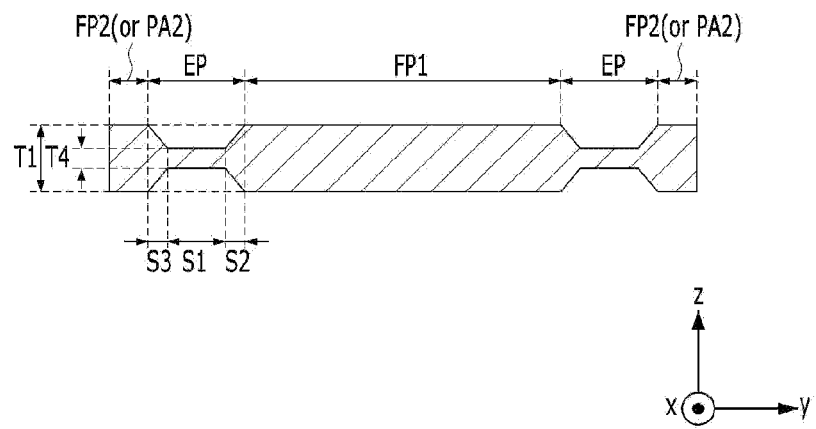
FIGS. 3a and 3b show a cross-sectional view of a first portion of a second plate according to an embodiment.
Figure 3B:
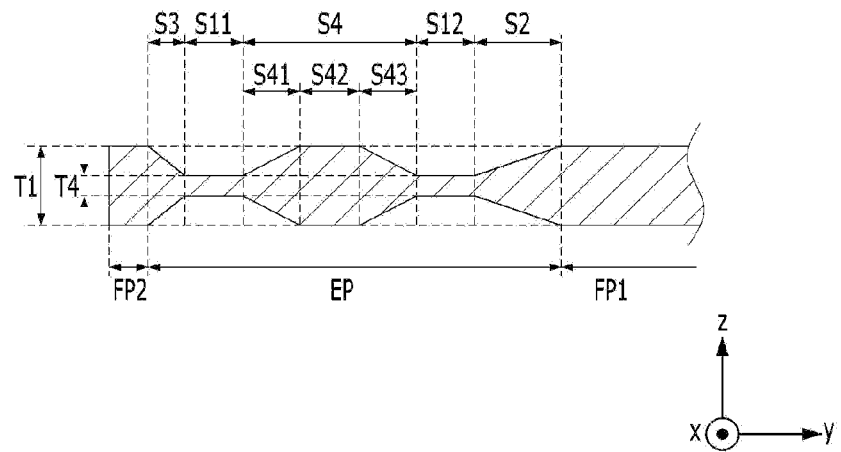

FIGS. 3a and 3b are cross-sectional views illustrating a first portion PA1 of a second plate P2 according to an embodiment. FIG. 3a illustrates the entire cross-section of the second plate P2, and for convenience of explanation, FIG. 3b illustrates only the left side portion in the cross-sectional shape of the second plate P2. The right side portion of the second plate P2, which is not illustrated in FIG. 3b, may be symmetrical to the left side portion illustrated in FIG. 3b in the y-axis direction, so it can be seen from FIG. 3b.

According to an embodiment, the number of the flat portions FP may be plural. For example, as illustrated in FIGS. 3a and 3b, the flat portion FP may comprise first and second flat portions FP1 and FP2. The first flat portion FP1 corresponds to the flat portion FP illustrated in FIG. 2, and the second flat portion FP2 may be disposed between the elastic portion EP and the second portion PA2 of the second plate P2.

According to another embodiment, the number of the flat portion FP is one as illustrated in FIG. 2, and the elastic portion EP may be in direct contact with the second portion PA2. In addition, when the second flat portion FP2 illustrated in FIGS. 3a and 3b corresponds to the second portion PA2 of the second plate P2, the second plate P2 illustrated in FIGS. 3a and 3b also has one flat portion FP1.

Hereinafter, for convenience of explanation, it will be described that the second flat portion FP2 illustrated in FIGS. 3a and 3b corresponds to the second portion PA2 of the second plate P2. That is, the flat portion mentioned below means a flat portion FP illustrated in FIG. 2 or a first flat portion FP1 illustrated in each of FIGS. 3a and 3b.

In addition, according to the embodiment, the elastic portion EP may comprise first to third segments S1 to S3. The first segment S1 may have a fourth thickness T4 smaller than the first thickness T1. The second segment S2 may be disposed between the first segment S1 and the flat portions FP and FP1. The third segment S3 may be disposed between the first segment S1 and the second portion PA2.

According to the embodiment, at least one of the second and third segments S2 and S3 may have a cross-sectional shape in which a thickness decreases as it approaches the first segment S1. For example, as illustrated in FIGS. 3a and 3b, each of the second and third segments S2 and S3 has a cross-sectional shape in which the thickness decreases as it approaches the first segment S1.

As described above, when the elastic portion EP comprises the first segment S1 having a fourth thickness T4 which is smaller than the first thickness T1, stress caused by the thermal expansion of the first and second liquids LQ1 and LQ2 is applied to the elastic portion EP instead of the flat portion FP and FP1, so that the influence on the flat portions FP and FP1 due to the stress can be reduced. In addition, when the thickness of at least one of the second and third segments S2 and S3 has a cross-sectional shape that decreases as it approaches the first segment S1, the elastic portion EP can be stretched flexibly when the liquids LQ1 and LQ2 expand or contract.

As illustrated in FIG. 3a, the elastic portion EP may comprise only one first segment S1. However, according to another embodiment, the elastic portion EP may comprise a plurality of first segments. For example, as illustrated in FIG. 3b, the elastic portion EP may comprise first-first and first-second segments S11 and S12.

When the number of first segments comprised in the elastic portion EP is plural, the elastic portion EP may further comprise a fourth segment S4 disposed between the first segments. For example, when the elastic portion EP comprises the first-first and first-second segments S11 and S12, as illustrated in FIG. 3b, the elastic portion EP may further comprise a fourth segment S4 disposed between the first-first segment S11 and the first-second segment S12.

Referring to FIG. 3b, the fourth segment S4 may comprise fourth-first to fourth-third segments S41 to S43. The fourth-first segment S41 is in contact with the first-first segment S11 and is located between the first-first segment S11 and the fourth-second segment S42. The fourth-third segment S43 is in contact with the first-second segment S12 and is located between the first-second segment S12 and the fourth-second segment S42. The fourth-second segment S42 is located between the fourth-first segment S41 and the fourth-third segment S43.

In addition, the fourth segment S4 may have a cross-sectional shape in which the thickness decreases as it approaches the first segment S1. For example, referring to FIG. 3b, the fourth-first segment S41 has a cross-sectional shape in which the thickness decreases as it approaches the first-first segment S11, and the fourth-third segment S43 may have a cross-sectional shape in which the thickness decreases as it approaches the first-second segment S12.

As described above, when the number of the first segments S1 is plural and the fourth segment S4 is disposed between the plurality of first segments S1, stress due to thermal expansion of the first and second liquids LQ1 and LQ2 may be more applied to the elastic portion EP instead of the flat portions FP and FP1. In addition, when the fourth segment S4 has a cross-sectional shape in which the thickness decreases as it approaches the first segment S1, the elastic portion EP can be stretched more flexibly.

In addition, the elastic portion EP may comprise at least one of a recess and a protruding portion. Referring to FIG. 3a, the first to third segments S1 to S3 may form a recess. In addition, referring to FIG. 3b, the fourth segment S4 may form a protruding portion, and the top surface of the fourth-second segment S42 may correspond to the upper surface of the protruding portion.

Figure 4A:
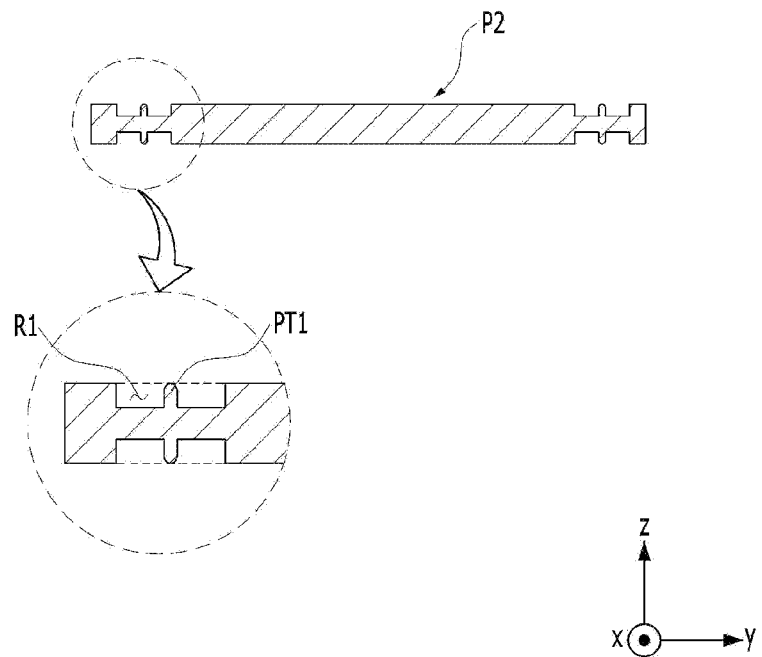
FIGS. 4a and 4b are cross-sectional views of a first portion of a second plate according to another embodiment.
Figure 4B:
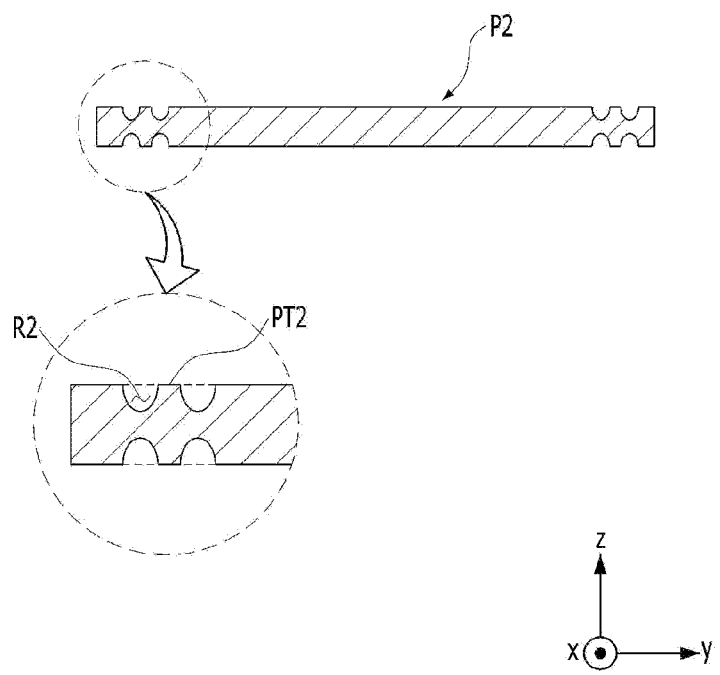

FIGS. 4a and 4b are cross-sectional views of a first portion PA1 of a second plate P2 according to another embodiment.

For example, as illustrated in each of FIGS. 4a and 4b, the elastic portion EP may comprise a plurality of recesses R1 and R2 and one of protruding portion PT1 and PT2, respectively.

In addition, according to an embodiment, each of the recess and the protruding portion may have a cross-sectional shape of at least one of a semicircle, a semi-ellipse, or a polygon (e.g., a triangle, a square, and the like). For example, as illustrated in FIG. 4a, the recess R1 may have a rectangular cross-sectional shape, and as illustrated in FIG. 4b, the recess R2 may have a semi-circular cross-sectional shape.

In addition, according to the embodiment, the elastic portion EP may have a zigzag shape.

Figure 5:
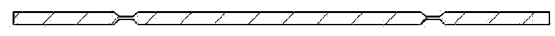
FIGS. 5 (a) and (b) are cross-sectional views showing the state before and after the elastic portion in the second plate is stretched according to an embodiment in a direction parallel to the optical axis.
Figure 5:
Figure 6:
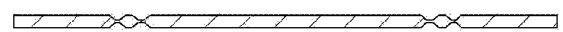
FIGS. 6 (a) and (b) are cross-sectional views showing the state before and after an elastic portion in a second plate is stretched according to another embodiment in a direction parallel to the optical axis.
Figure 6:
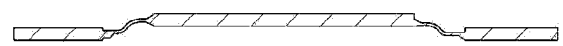
Figure 7:
FIGS. 7 (a) and (b) are cross-sectional views showing the state before and after an elastic portion in a second plate is stretched according to another embodiment in a direction parallel to the optical axis.
Figure 7:

FIGS. 5 to 7 are cross-sectional views showing before and after the elastic portion EP in the second plate P2 is stretched according to the embodiment in a direction parallel to the optical axis.

FIG. 5 (a), FIG. 6 (a), and FIG. 7 (a) show a cross-section before the first and second liquids LQ1 and LQ2 are thermally expanded, that is, before the elastic portion EP is stretched, FIG. 5 (b), FIG. 6 (b), and FIG. 7 (b) show cross-sections after the elastic portion EP is stretched by thermal expansion of the first and second liquids LQ1 and LQ2.

When implementing the elastic portion EP at both ends of the first portion PA1 of the second plate P2 in various forms as described above, stress may be more concentrated on the elastic portion EP than in the flat portions FP and FP1 when the first and second liquids LQ1 and LQ2 are thermally expanded. That is, the flat portions FP and FP1 move in parallel in the optical axis direction as the elastic portion EP stretches like a spring as illustrated in FIG. 5 (b), FIG. 6 (b), and FIG. 7 (b), the optical performance of the liquid lens 100A does not deteriorate and can be kept well.

Meanwhile, the first plate P1 and the second plate P2 may be coupled to each other in various ways.

The second portion PA2 of the second plate P2 may comprise a bonding area BA. In the bonding area BA, the second plate P2 may be coupled to the first plate P1 by bonding.

Figure 8A:
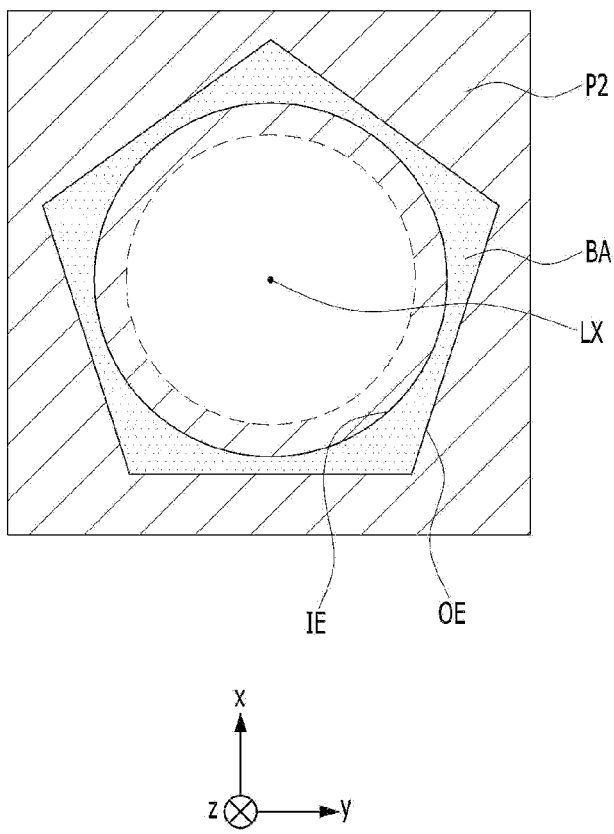
FIGS. 8a and 8b show a bottom view of a liquid lens according to an embodiment.
Figure 8B:
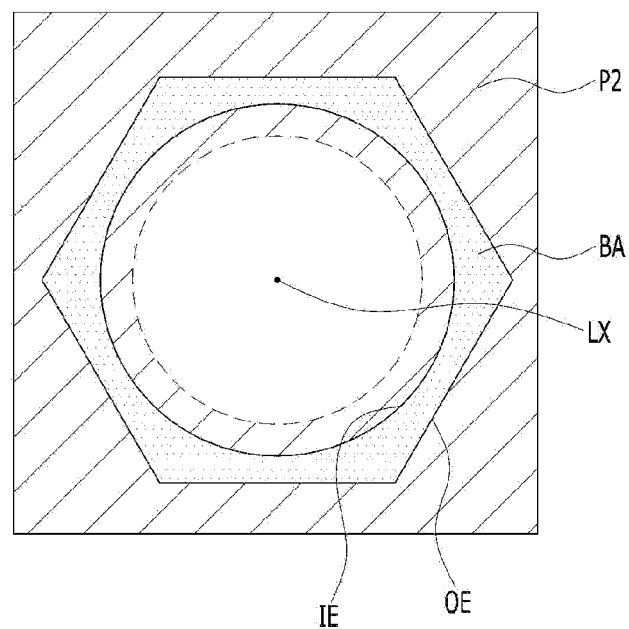
Figure 8B:
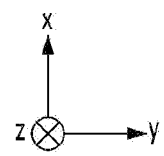

FIGS. 8a and 8b show a bottom view of the liquid lens 100 according to the embodiment. For convenience of description, FIGS. 8a and 8b illustrate only the second plate P2.

Referring to FIGS. 8a and 8b, the second plate P2 comprises a bonding area BA. Each bonding area BA has an inner edge IE and an outer edge OE. At least one of the inner edge IE or the outer edge OE of the bonding area BA may have a polygonal bottom shape. For example, the outer edge of the bonding area BA may have a pentagonal bottom shape as illustrated in FIG. 8a or a hexagonal bottom shape as illustrated in FIG. 8b.

Figure 9:
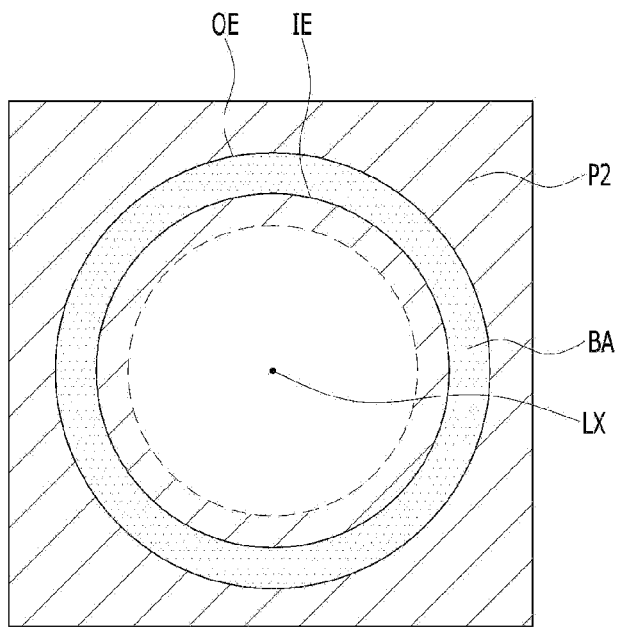
FIG. 9 shows a bottom view of a liquid lens according to a comparative example.
Figure 9:
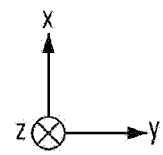

FIG. 9 shows a bottom view of a liquid lens according to a comparative embodiment.

The second plate P2 of the liquid lens according to the comparative embodiment illustrated in FIG. 9 performs the same role as the second plate P2 of the liquid lens 100 according to the first embodiment of the present invention. Except that the shape of the bottom surface of the outer edge OE of the second plate P2 illustrated in FIG. 9 is different, it is assumed that the liquid lens according to the comparative embodiment illustrated in FIG. 9 is the same as the liquid lens 100 according to the first embodiment of the present invention.

As illustrated in FIG. 9, when the outer edge of the bonding area BA has a circular bottom shape, the stress caused by thermal expansion of the first and second liquids LQ1 and LQ2 is mostly applied to the origin having the same distance as the edge portion OE of the circle, that is, the center of the second plate P2, that is, the optical axis LX, so that the second plate P2 may be damaged.

However, as illustrated in FIGS. 8a and 8b, when the outer edge of the bonding area BA of the second plate P2 is not circular, but has a polygonal planar shape, the stress caused by the thermal expansion of the first and second liquids LQ1 and LQ2 is distributed not only to the center of the second plate P2, that is, the optical axis LX but also to each edge of the bonding area BA outer edge OE with a different distance from the center, so that the second plate P2 may receive less stress than when the outer edge OE is circular. In addition, when the outer edge OE is polygonal, as illustrated in FIGS. 8a and 8b, than when the outer edge OE is circular as illustrated in FIG. 9, as the area of the bonding area BA is increased, the bending or breakage of the second plate P2 may be further prevented or minimized when the volume of liquids LQ1 and LQ2 are expanded with temperature.

As illustrated in FIG. 1, the first and second plates P1 and P2 of the liquid lens 100 may be coupled to each other by an adhesive 148.

For example, the adhesive 148 may be disposed in the bonding area BA illustrated in FIGS. 8a, 8b, and 9. Alternatively, when the member 148 and the second plate P2 in the lens 100 illustrated in FIG. 1 are integrated, the first and second plates P1 and P2 may be bonded to each other by bonding in the bonding area BA.

Figure 10A:
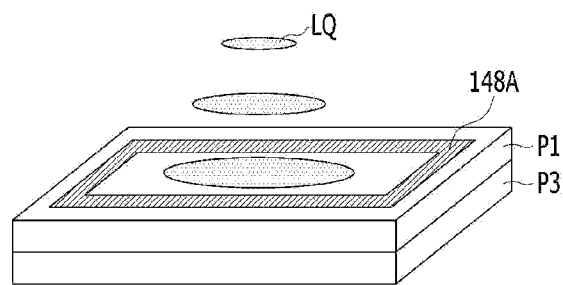
FIGS. 10a to 10c are perspective views showing a manufacturing process of forming an adhesive 148 in a liquid lens illustrated in FIG. 1.
Figure 10B:
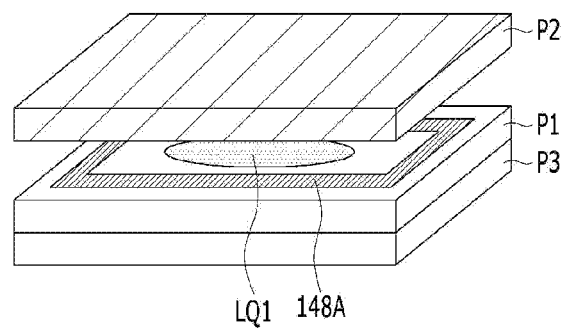
Figure 10C:
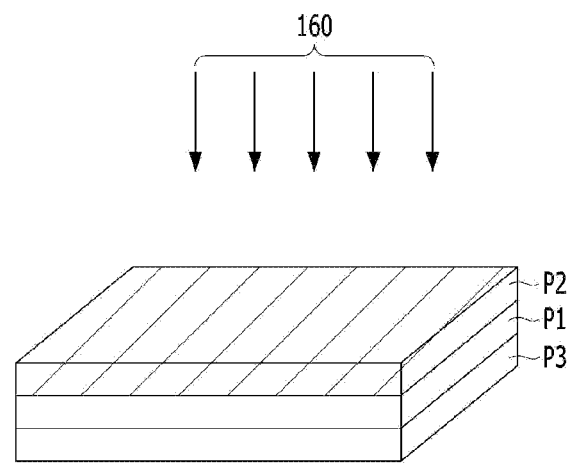

FIGS. 10a to 10c are perspective views illustrating a manufacturing process of forming an adhesive 148 in the liquid lens 100 illustrated in FIG. 1.

Referring to FIG. 10a, a liquid LQ is filled in the cavity CA in the first plate P1 and a material 148A for manufacturing the adhesive 148 is disposed around the cavity CA.

Thereafter, referring to FIG. 10b, the liquid LQ2 is filled in the cavity CA and the second plate P2 is covered on the first plate P1 on which the adhesive 148 manufacturing material 148A is formed.

Then, referring to FIG. 10c, by applying heat or UV 160 on the resultant illustrated in FIG. 10b to cure the material 148A for manufacturing the adhesive 148, the first and second plates P1 and P2 may be bonded to each other.

The adhesive 148 is not limited to the manufacturing method illustrated in FIGS. 10a to 10c, and may be manufactured by other methods.

In addition, the adhesive 148 may be manufactured in various forms, for example, by using side sealing molding (SSM).

When the first and second plates P1 and P2 are combined by bonding, a large amount of stress is applied to the second plate P2 and it may be destroyed when the first and second liquids LQ1 and LQ2 are thermally expanded since the binding area of the first and second plates P1 and P2 are not expanded.

However, when the first and second plates P1 and P2 are joined by an adhesive 148 as illustrated in FIG. 1, the stress applied to the second plate P2 may be reduced as much as possible because the volume of the adhesive 148 expands in the direction A1 indicated by the arrow when the first and second liquids LQ1 and LQ2 are thermally expanded. Due to this, when the first and second liquids LQ1 and LQ2 are thermally expanded, the second plate P2 may move in parallel, thereby preventing or minimizing deterioration of optical performance. To this end, according to the embodiment, the thermal expansion coefficient of the adhesive 148 may be greater than that of the second plate P2.

The liquid lens 100 according to the above-described embodiment may be applied to various fields.

Hereinafter, the configuration and operation of the lens assembly and the camera module according to the first embodiment comprising the liquid lens described above will be described with reference to the accompanying drawings.

Figure 11:
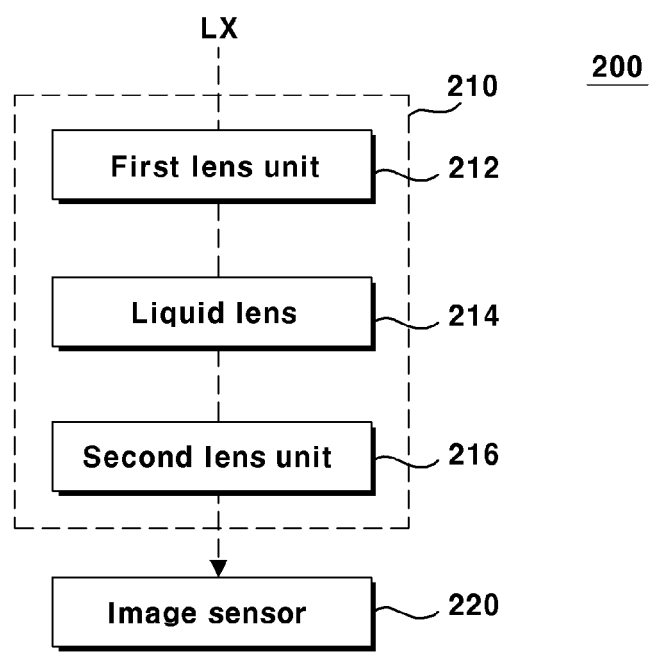
FIG. 11 is a block diagram of a camera module according to a first embodiment of the present invention.

FIG. 11 shows a block diagram of the camera module 200 according to the first embodiment of the present invention.

The camera module 200 according to a first embodiment of the present invention may comprise a lens assembly 210 and an image sensor 220.

The lens assembly 210 according to a first embodiment of the present invention may comprise at least one lens and a liquid lens 214. Here, the liquid lens 214 may refer to the liquid lens 100 illustrated in FIG. 1.

At least one lens may be aligned with the liquid lens 214 and the optical axis LX. For example, the at least one lens may comprise a plurality of lenses, as illustrated in FIG. 11. The plurality of lenses may comprise a first lens unit 212 and a second lens unit 216. Each of the first and second lens units 212 and 216 may comprise at least one lens. At least one of the first and second lens units 212 and 216 may be omitted.

Each of the plurality of lenses may be a solid lens or a liquid lens, and the lens assembly 210 according to the embodiment is not limited to a specific shape of the lens.

In the case of FIG. 11, the liquid lens 214 is illustrated as being disposed between the first lens unit 212 and the second lens unit 216, but the embodiment is not limited thereto. That is, according to another embodiment, the liquid lens 214 may be disposed above the first lens unit 212 or below the second lens unit 216. As such, the liquid lens 214 may be disposed between the plurality of lenses, above the plurality of lenses, and below the plurality of lenses.

In addition, the liquid lens 214 may also play the role of any one of the plurality of lenses.

In addition, the image sensor 220 may generate image data by receiving light passing through the openings of the liquid lens 214 (e.g., the first and second openings O1 and O2 illustrated in FIG. 1) and at least one lens. To this end, the image sensor 220 may be aligned with the liquid lens 214 and at least one lens (e.g., 212 and 216 illustrated in FIG. 11) along the optical axis LX.

In addition, as illustrated in FIG. 11, since the liquid lens 214 may play the role of a target lens of any one of the plurality of lenses, the number of lenses comprised in the lens assembly 210 may be reduced. Accordingly, the size of the lens assembly 210 may be reduced.

Figure 12:
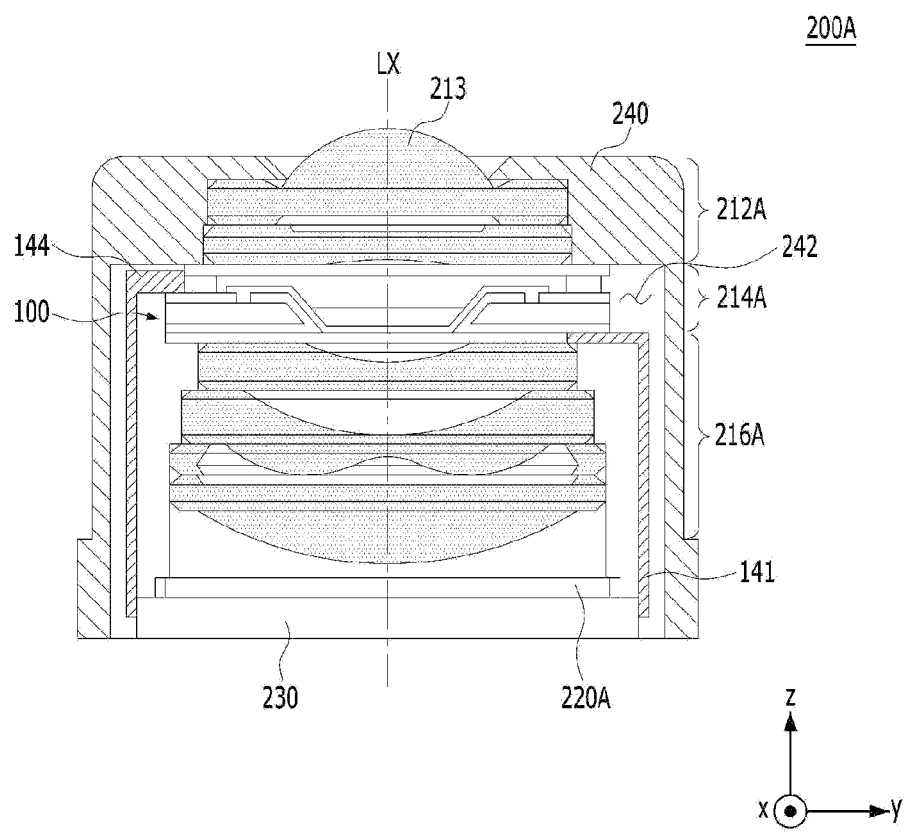
FIG. 12 is a cross-sectional view of a camera module illustrated in FIG. 11 according to an embodiment.

FIG. 12 is a cross-sectional view of a camera module illustrated in FIG. 11 according to an embodiment.

As illustrated, the camera module 200A may comprise a first lens unit 212A, a liquid lens 214A, a second lens unit 216A, an image sensor 220A, a main board 230 and a lens holder 240. Here, the first lens unit 212A, the liquid lens 214A, and the second lens unit 216A correspond to the embodiment of the lens assembly 210 illustrated in FIG. 11.

In addition, the first lens unit 212A, the liquid lens 214A, the second lens unit 216A, and the image sensor 220A illustrated in FIG. 12 correspond to the embodiment of the first lens unit 212, the liquid lens 214, the second lens unit 216, and the image sensor 220 illustrated in FIG. 11, respectively, and performs the same function.

The structure of the lens assembly illustrated in FIG. 12 is only one example, and the structure of the lens assembly may vary according to specifications required for the camera modules 200 and 200A. For example, in the illustrated example, the liquid lens 214A is located between the first lens unit 212A and the second lens unit 216A, but in another example, the liquid lens 214A may be located above (front) than the first lens unit 212A, and one of the first lens unit 212A and the second lens unit 216A may be omitted.

In FIG. 12, the first lens unit 212A is disposed in front of the lens assembly and is a portion where light is incident from the outside of the lens assembly. The first lens unit 212A may comprise at least one lens, or two or more lenses may be aligned with respect to the central axis LX to form an optical system.

The first lens unit 212A and the second lens unit 216A may be mounted on the lens holder 240. At this time, a through hole may be formed in the lens holder 240, and the first lens unit 212A and the second lens unit 216A may be disposed in the through hole. In addition, a liquid lens 214A may be inserted into a space, in which the first lens unit 212A and the second lens unit 216A are disposed therebetween, in the lens holder 240.

Meanwhile, the first lens unit 212A may comprise an exposure lens 213. The exposure lens 213 refers to a lens that can be exposed to the outside by protruding out of the lens holder 240. In the case of the exposure lens 213, the lens surface may be damaged due to exposure to the outside. When the lens surface is damaged, the image quality of the image photographed by the camera module 200A may be deteriorated. In order to prevent or suppress damage to the surface of the exposure lens 213, a method of disposing a cover glass, forming a coating layer, or configuring the exposure lens 213 with a wear-resistant material to prevent surface damage, and the like may be applied.

The second lens unit 216A is disposed rear side of the first lens unit 212A and the liquid lens 214A, the light incident on the first lens unit 212A from the outside may pass through the liquid lens 214A and incident on the second lens unit 216A. The second lens unit 216A may be disposed in a through hole formed in the lens holder 240 spaced apart from the first lens unit 212A.

Meanwhile, the second lens unit 216A may be provided as at least one lens, and when plural lenses of two or more are comprised, the optical system may be formed by aligning based on the central axis LX.

The liquid lens 214A is disposed between the first lens unit 212A and the second lens unit 216A, and may be inserted into the insertion hole 242 of the lens holder 240. The insertion hole 242 may be formed by opening a partial region of the side surface of the lens holder 240. That is, the liquid lens 214A may be inserted and disposed through the insertion hole 242 on the side surface of the lens holder 240. The liquid lens 214A may also be aligned with respect to the central axis LX like the first lens unit 212A and the second lens unit 216A.

In addition, the lens assembly may further comprise a first connection substrate 141 and a second connection substrate 144. The interface BO of the conductive liquid LQ1 and the non-conductive liquid LQ2 is deformed by the driving voltage applied through the first and second connection substrates 141 and 144, so that the curvature and focal length of the liquid lens 214A may be changed.

Hereinafter, a comparative embodiment and a camera module comprising a liquid lens and a lens according to a first embodiment of the present invention will be described with reference to the accompanying drawings.

Figure 13A:
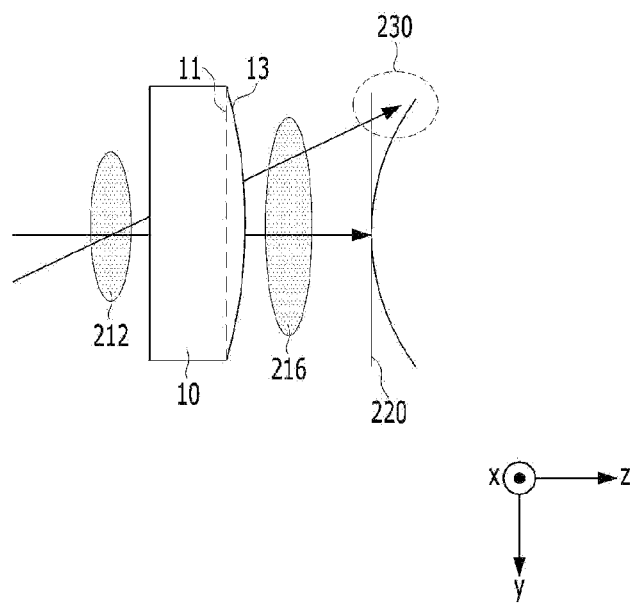
FIG. 13a is a cross-sectional view of a camera module according to a comparative embodiment.
Figure 13B:
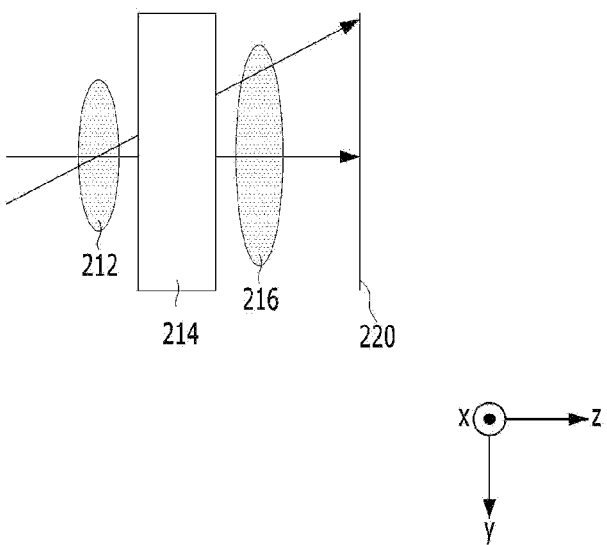
FIG. 13b is a cross-sectional view of a liquid lens according to a first embodiment of the present invention.

FIG. 13a is a cross-sectional view of a camera module according to a comparative embodiment, and FIG. 13b is a cross-sectional view of a liquid lens according to a first embodiment of the present invention.

The camera module according to the comparative embodiment illustrated in FIG. 13a comprises a first lens unit 212, a liquid lens 10, a second lens unit 216, and an image sensor 220, and the camera module according to the embodiment illustrated in FIG. 13b comprises a first lens unit 212, a liquid lens 214, a second lens unit 216, and an image sensor 220. The first lens unit 212, the second lens unit 216, and the image sensor 220 illustrated in FIG. 13a correspond respectively to the first lens units 212 and 212A, the second lens units 216 and 216A, and the image sensors 220 and 220A illustrated in FIGS. 11 and 12, the same reference numerals are used, and overlapping descriptions are omitted.

The camera module according to the comparative embodiment illustrated in FIG. 13a comprises a liquid lens 10, and the camera module according to the embodiment illustrated in FIG. 13b comprises a liquid lens 214. For convenience of explanation, the liquid lens 10 according to the comparative embodiment illustrated in FIG. 13a is assumed that it has the same configuration as the liquid lens 100 according to the embodiment illustrated in FIG. 1, but has different characteristics of the first to third plates P1 to P3. The liquid lens 214 illustrated in FIG. 13b may be the liquid lens 100 illustrated in FIG. 1. In addition, the image sensor 220 illustrated in each of FIGS. 13a and 13b may correspond to the imaging plane of the image sensors 220 and 220A illustrated in FIGS. 11 and 12.

When the room temperature of the liquid lens 10 is 25° C. or higher, the second plate P2 is subjected to receive stress due to the expansion of the first and second liquids LQ1 and LQ2 different from each other, and thus one surface 11 of the second plate P2 facing the image sensor 220 in the liquid lens 10 swells 13 and may be deformed or even destroyed. In order to solve this problem, the thickness of the second plate P2 may be reduced to minimize the stress applied to the second plate P2. However, if an etching process is added to reduce the thickness of the second plate P2, manufacturing cost and manufacturing time may increase, and the structure of the liquid lens 10 may become complicated.

In addition, as the temperature of the liquid lens 10 rises, the first and second liquids LQ1 and LQ2 expand and the curvature of the second plate P2 gradually increases or decreases, thereby generating a curvature 230 that may lead to deterioration of optical performance such as a decrease in resolution.

On the other hand, in the case of the liquid lens 214 according to the embodiment, in order to minimize the effect of the thermal expansion of the first and second liquids LQ1 and LQ2 on the second plate P2 according to the temperature, the third thickness T3 of the third plate P3 is implemented similarly or equal to the first thickness T1 of the second plate P2, or the second plate P2 is implemented to have an elastic portion EP, or one of the outer edge or inner angle of the bonding area BA is implemented to have a polygonal planar shape, or the first and second plates P1 and P2 may be coupled by an adhesive 148 instead of bonding. Accordingly, as illustrated in FIG. 13b, deformation of the second plate P2 of the liquid lens 214 at various temperatures or high temperatures is minimized, and thus optical performance can be improved.

Meanwhile, an optical device may be implemented using the camera modules 200 and 200A comprising the liquid lens 100 according to the above-described embodiment.

Here, the optical device may comprise a device capable of processing or analyzing an optical signal. Examples of optical devices may comprise a camera/video device, a telescope device, a microscope device, an interferometer device, a photometric device, a polarimeter device, a spectrometer device, a reflectometer device, an autocollimator device, a lensmeter device, and the like, and the present embodiment may be applied to an optical device that may comprise a lens assembly.

In addition, the optical device may be implemented as a portable device such as a smart phone, a notebook computer, or a tablet computer. These optical devices comprise camera modules 200 and 200A, a display unit (not shown) for outputting an image, a battery (not shown) for supplying power to the camera modules 200 and 200A, a main body housing for mounting the camera modules 200 and 200A, the display unit, and the battery. The optical device may further comprise a communication module capable of communicating with other devices, and a memory unit capable of storing data. The communication module and the memory unit may also be mounted in the main body housing.

Hereinafter, an optical device 300 comprising a liquid lens according to an embodiment will be described with reference to the accompanying drawings, but the optical device 300 according to the embodiment is not limited thereto.

Figure 14:
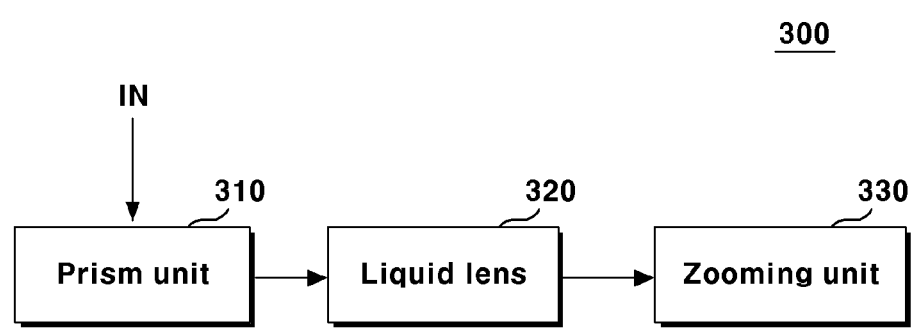
FIG. 14 is a schematic block diagram of an optical device according to a first embodiment of the present invention.
Figure 14:
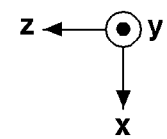

FIG. 14 is a schematic block diagram of an optical device 300 according to a first embodiment of the present invention.

The optical device 300 may comprise a prism unit 310, a liquid lens 320, and a zooming unit 330. Here, the liquid lens 320 may correspond to the aforementioned liquid lenses 100, 214, and 214A.

The prism unit 310 plays the role of changing the path of the light incident in the direction indicated by IN to the optical axis LX of the liquid lens 320.

For the light whose optical path is changed in the prism unit 310, the liquid lens 320 may perform OIS and AF functions to be emitted to the zooming unit 330.

The zooming unit 330 zooms in/outs or focuses the light passing through the liquid lens 320. To this end, the zooming unit 330 may comprise a plurality of lenses (not shown) and an actuator (not shown) for moving the lenses in a direction parallel to the optical axis LX (e.g., the z-axis direction).

Hereinafter, a configuration of the optical device according to a second embodiment of the present embodiment will be described.

An optical device may be any one among a cell phone, a mobile phone, a smart phone, a portable smart device, a digital camera, a laptop computer, a digital broadcasting terminal, a personal digital assistant (PDA), a portable multimedia player (PMP), and navigation. However, the type of the optical device is not limited thereto, and any device for photographing an image or picture may be comprised in the optical device.

The optical device may comprise a main body. The main body may form the appearance of the optical device. The main body can accommodate a camera device 1010. A display unit may be disposed on one surface of the main body. For example, a display unit and a camera device 1010 may be disposed on one surface of the main body, and another camera device 1010 may be additionally disposed on the other surface of the main body (a surface located on the opposite side of the one surface).

The optical device may comprise a display unit. The display unit may be disposed on one surface of the main body. The display unit may output an image captured by the camera device 1010.

The optical device may comprise a camera device 1010. The camera device 1010 may be disposed in the main body. At least a portion of the camera device 1010 may be accommodated inside the main body. A plurality of camera devices 1010 may be provided. The camera devices 1010 may comprise a dual camera device. The camera devices 1010 may be disposed on one side of the main body and the other side of the main body, respectively. The camera device 1010 may photograph an image of a subject.

Hereinafter, the configuration of a camera device according to a second embodiment of the present invention will be described with reference to the drawings.

Figure 15:
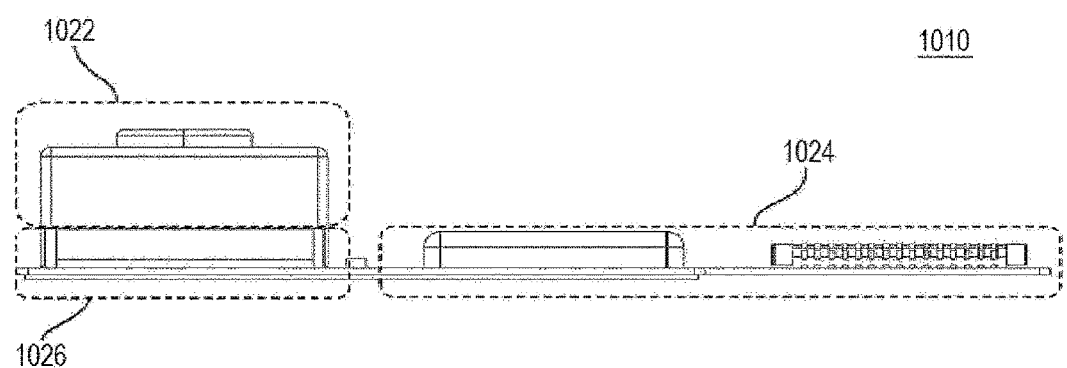
FIG. 15 is a side view illustrating a camera device according to a second embodiment of the present invention.

FIG. 15 is a side view illustrating a camera device according to a second embodiment of the present invention.

The camera device 1010 may comprise a camera module.

The camera device 1010 may comprise a control unit 1024. The control unit 1024 may output a signal for applying a driving voltage and/or a driving current to a liquid lens 1500. The control unit 1024 may comprise a driver IC 1025 for applying a current to the liquid lens 1500. However, the driver IC 1025 may be provided separately from the control unit 1024, and the control unit 1024 may control the driver IC 1025. The control unit 1024 may comprise a memory unit in which values of a driving voltage and/or a driving current to be applied to the liquid lens 1500 are stored in order to implement a focus value corresponding to the distance of the subject. The control unit 1024 may be implemented as a single chip. The control unit 1024 may comprise a connector connected to the configuration of the optical device. The connector may be understood as a configuration separate from the control unit 1024.

The camera device 1010 may comprise an image sensor 126. Image sensor 126 may be aligned with lens assembly 1022. The image sensor 126 may be disposed so that the lens and the optical axis coincide. The optical axis of the image sensor 126 and the optical axis of the lens may be aligned. The image sensor 126 may be disposed on a printed circuit board. The image sensor 126 may be electrically connected to the printed circuit board. The image sensor 126 may be coupled to a printed circuit board by surface mounting technology (SMT) or wire bonding. As a modified embodiment, the image sensor 126 may be coupled to a printed circuit board by flip chip technology. The image sensor 126 may convert light transmitted through the lens assembly 1022 into an electrical signal. The image sensor 126 may convert light irradiated to the effective image area of the image sensor 126 into an electrical signal. The image sensor 126 may be any one among a charge coupled device (CCD), a metal oxide semi-conductor (MOS), a CPD, and a CID.

The camera device 1010 may comprise a lens assembly 1022. The lens assembly 1022 will be described later with reference to the drawings.

Hereinafter, a configuration of a lens assembly according to a second embodiment of the present invention will be described with reference to the drawings.

Figure 16:
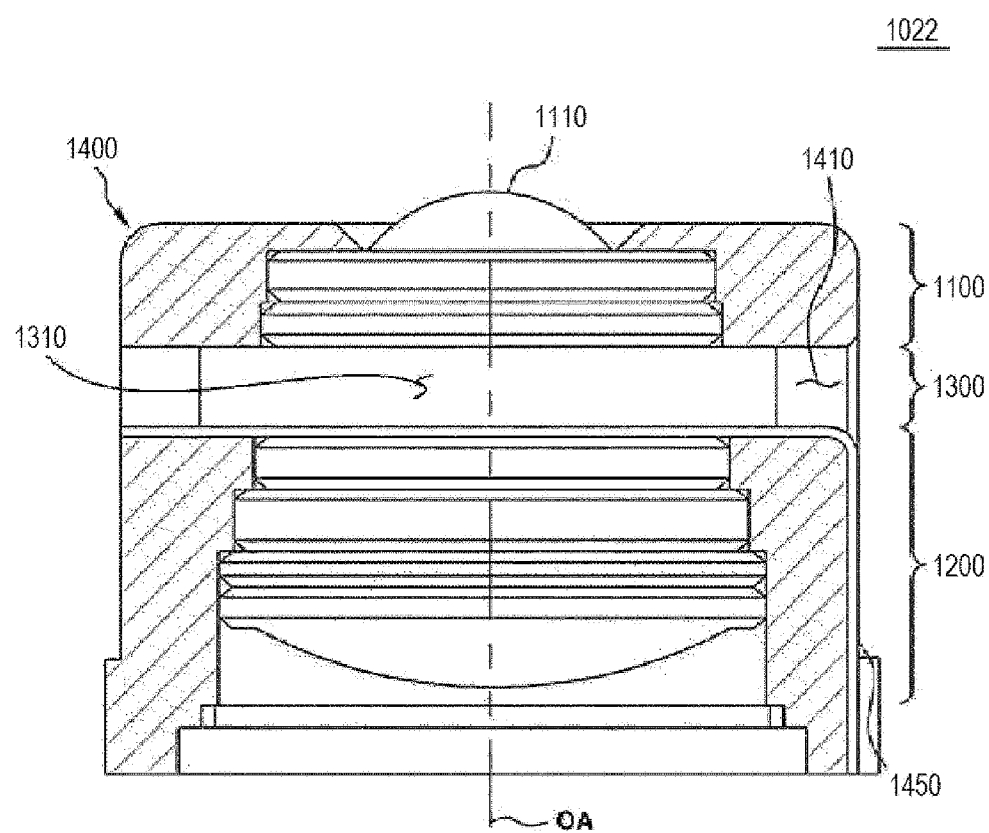
FIG. 16 is a cross-sectional view illustrating a lens assembly according to a second embodiment of the present invention.

FIG. 16 is a cross-sectional view illustrating a lens assembly according to a second embodiment of the present invention.

The lens assembly 1022 may comprise a lens. The lens assembly 1022 may comprise a plurality of lenses. The lens assembly 1022 may comprise an upper lens 1100 and a lower lens 1200. At this time, the upper lens 1100 may be referred to as a first lens, and the lower lens may be referred to as a second lens. A liquid lens 1500 may be disposed between the upper lens 1100 and the lower lens 1200. The upper lens 1100 may be disposed above the liquid lens 1500, and the lower lens 1200 may be disposed below the liquid lens 1500. The upper lens 1100 may be disposed on the outermost side. However, in a modified embodiment, the liquid lens 1500 may be disposed above the upper lens 1100 or disposed below the lower lens 1200. In addition, as a modified embodiment, any one or more of the upper lens 1100 and the lower lens 1200 may be omitted.

The upper lens 1100 may comprise a plurality of lenses. The upper lens 1100 may comprise two lenses. The lower lens 1200 may comprise a plurality of lenses. The lower lens 1200 may comprise three lenses. The liquid lens 1500 may be disposed between the second lens and the third lens from the top among a total of five lenses. In another embodiment, the liquid lens 1500 may be disposed between the third lens and the fourth lens from the top among the plurality of lenses. The optical axis of the upper lens 1100, the optical axis of the liquid lens 1500, and the optical axis of the lower lens 1200 may all be aligned.

The upper lens 1100 may comprise an outermost lens 1110. The outermost lens 1110 may be further protruded than the upper surface of the housing 1400. The outermost lens 1110 may be protruded toward the outside of the housing 1400. A cover glass or a coating layer may be formed on the surface of the outermost lens 1110. Alternatively, in order to prevent damage to the surface of the outermost lens 1110, the outermost lens 1110 may be formed of a wear-resistant material.

The lens assembly 1022 may comprise a variable lens. The variable lens may be a variable focus lens. The variable lens may be a lens whose focus is adjusted. The focus may be adjusted by moving the lens and/or changing the shape of the lens. The variable lens may comprise a liquid lens 1500.

The lens assembly 1022 may comprise a liquid lens unit 1300. The liquid lens unit 1300 may be disposed between the upper lens 1100 and the lower lens 1200. The liquid lens unit 1300 may comprise a liquid lens 1500 and a holder for fixing the liquid lens 1500. Here, the holder of the liquid lens unit 1300 may be distinguished from the case 1510 of the liquid lens 1500 as a liquid lens holder. The liquid lens unit 1300 can be inserted into and coupled to a space between the upper lens 1100 and the lower lens 1200 from the side of the housing 1400 in a state where the upper lens 1100 and the lower lens 1200 are fixed to the housing 1400. The liquid lens unit 1300 may be inserted through the insertion hole 1410 of the housing 1400.

The liquid lens unit 1300 may comprise a lens region 1310. The lens region 1310 may be a portion through which light passing through the upper lens 1100 is transmitted. A liquid may be disposed on at least a portion of the lens region 1310. The liquid lens unit 1300 may be electrically conducted with the printed circuit board through the connection portion 1450.

The lens assembly 1022 may comprise a housing 1400. The housing 1400 may comprise a first hole penetrating the housing 1400 in the optical axis direction. An upper lens 1100, a lower lens 1200, and a liquid lens 1500 may be disposed in the first hole of the housing 1400. The housing 1400 may comprise a second hole penetrating the housing 1400 in a direction perpendicular to the optical axis. The first hole and the second hole of the housing 1400 may be connected to each other. The liquid lens 1500 may be inserted into the second hole of the housing 1400 along the horizontal direction. At least a portion of the liquid lens 1500 and the case of the liquid lens unit 1300 may be disposed in the second hole of the housing 1400. An upper lens 1100 and a lower lens 1200 may be disposed in the housing 1400. An upper lens 1100 and a lower lens 1200 may be coupled to the housing 1400. The upper lens 1100 and the lower lens 1200 may be fixed to the housing 1400 by an adhesive.

The lens assembly 1022 may comprise a connection portion 1450. The connection portion 1450 may electrically connect the liquid lens 1500 and the printed circuit board. The connection portion 1450 may be extended along the housing 1400. At least a portion of the connection portion 1450 may be extended along a side surface of the housing 1400. The connection portion 1450 may comprise a flexible printed circuit board (FPCB). In a modified embodiment, the connection portion 1450 may comprise a terminal. The connection portion 1450 may comprise an insert terminal that is insert-injected onto a surface of the housing 1400. The connection portion 1450 may comprise an MID terminal formed on a surface of the housing 1400 through a molded interconnection device (MID) method. The connection portion 1450 may be formed separately from the housing 1400 and disposed on an outer surface of the housing 1400.

Hereinafter, a liquid lens according to a second embodiment of the present invention will be described with reference to the drawings.

Figure 17:
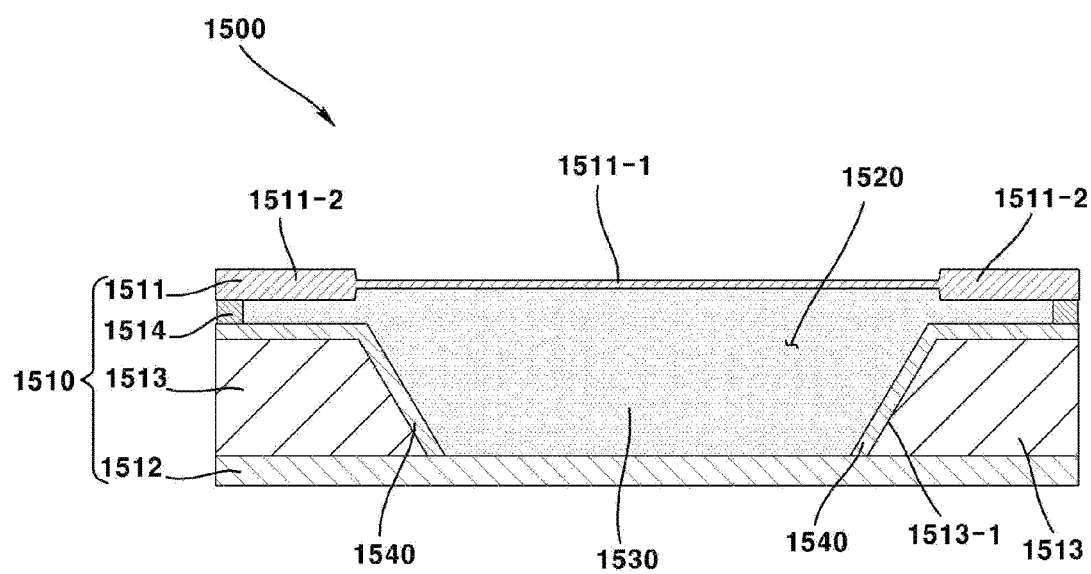
FIG. 17 is a conceptual diagram conceptually illustrating a liquid lens according to a second embodiment of the present invention.
Figure 18:
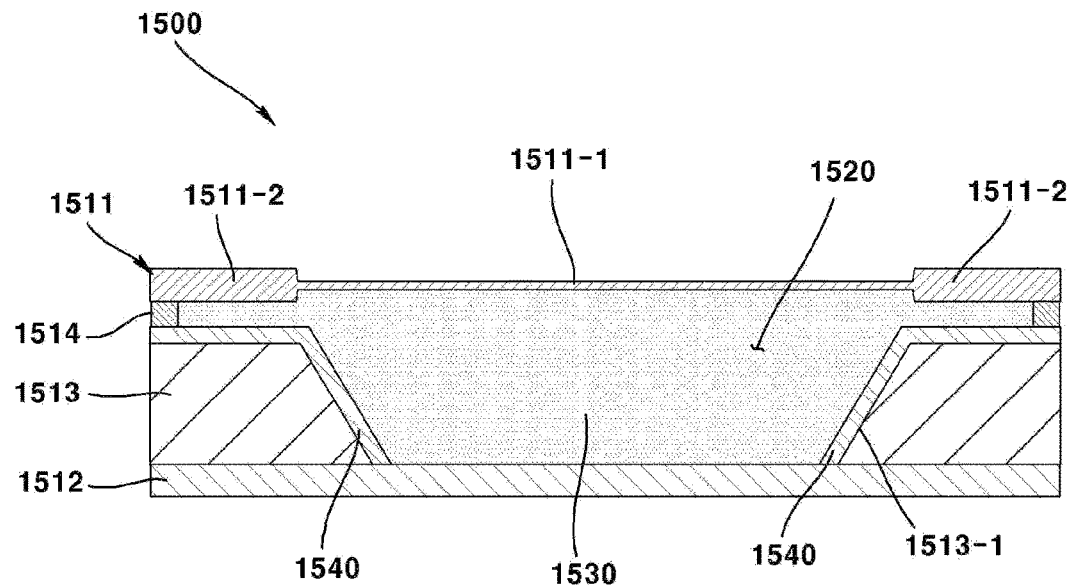
FIG. 18 (a) is a conceptual diagram illustrating an initial state in which no current is applied to a liquid lens of a second embodiment of the present invention, and (b) is a conceptual diagram illustrating an operating state in which a current is applied to a liquid lens of a second embodiment of the present invention.
Figure 18:
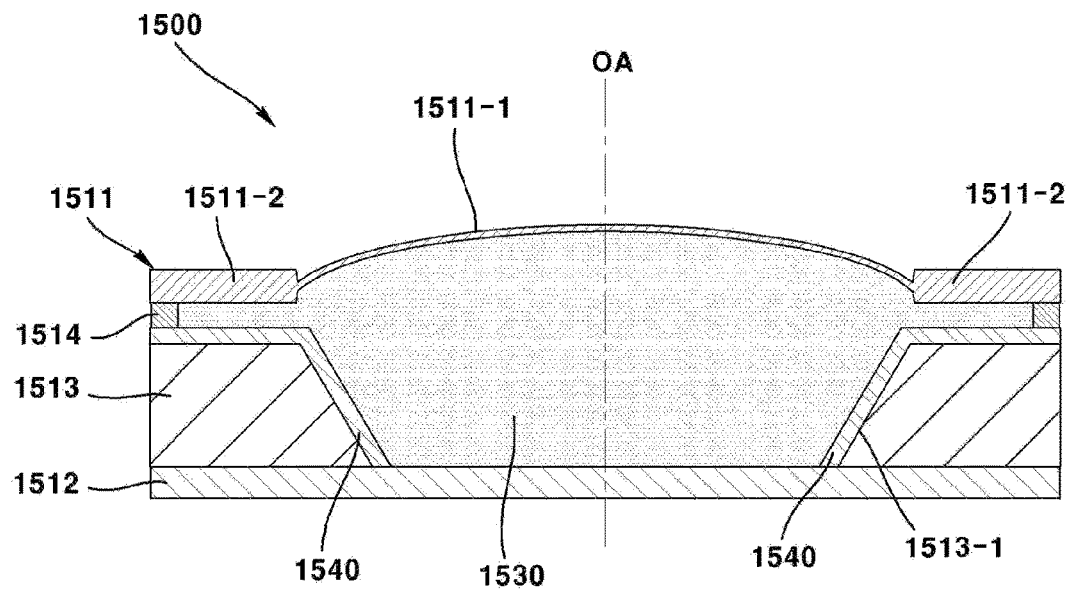

FIG. 17 is a conceptual diagram conceptually illustrating a liquid lens according to a second embodiment of the present invention, and FIG. 18 (*a*) is a conceptual diagram illustrating an initial state in which no current is applied to a liquid lens of a second embodiment of the present invention, and (*b*) is a conceptual diagram illustrating an operating state in which a current is applied to a liquid lens of a second embodiment of the present invention.

The liquid lens 1500 may be driven for auto focus (AF). The focal length may be adjusted by driving the liquid lens 1500. The liquid lens 1500 may be driven for optical image stabilization (OIS). When the liquid lens 1500 is viewed from above, the liquid lens 1500 may be divided into four regions corresponding to first to fourth quadrants. A heating member 1540 that is driven independently may be disposed in each of the four regions corresponding to the first to fourth quadrants of the liquid lens 1500. Through this, a first portion 1511-1 of the first plate 1511 of the liquid lens 1500 may be asymmetrically deformed with respect to the optical axis. The interface of the liquid lens 1500 may be tilt driven.

The liquid lens 1500 may be disposed on the optical axis OA. In an initial state in which no current is applied to the heating member 1540, the first plate 1511 of the liquid lens 1500 may be flatly disposed as illustrated in FIG. 18 (*a*). On the other hand, when current and/or voltage is applied to the heating member 1540, as illustrated in FIG. 18 (*b*), the liquid 1530 inside the liquid lens 1500 is heated and swelled, so that the first plate 1511 may also swell. Through this, the liquid lens 1500 may perform focusing.

The liquid lens 1500 may comprise a case 1510. The case 1510 may form a chamber 1520 therein. The case 1510 may accommodate the liquid 1530 therein. The case 1510 may be formed of a transparent material. The case 1510 may comprise glass. In a second embodiment of the present invention, the change in the interface of the glass can be reflected when designing the lens in connection with the change in the diopter value. The camera device 1010 according to a second embodiment of the present invention may comprise a memory in which a lookup table is stored. At this time, a change in diopter value according to current or voltage and/or a change in curvature of glass according to current or voltage may be stored in the lookup table as a numerical value.

The case 1510 may comprise a plate. The case 1510 may be a plate. The case 1510 may have a plate shape. The case 1510 may comprise a plate that is deformed by expansion of the liquid 1530 accommodated therein. The case 1510 may comprise a plurality of plates. Each of the plurality of plates may be formed of a transparent material. Each of the plurality of plates may comprise glass.

The case 1510 may comprises a connection member 1514 disposed between the first plate 1511 and the second plate 1512. The connection member contacts both the first plate 1511 and the second plate 1512.

The case 1510 may comprise a first plate 1511. The first plate 1511 may be an upper plate. The first plate 1511 may be a top glass. The first plate 1511 may be disposed so that the optical axis OA passes therethrough. The first plate 1511 may be disposed at one side of the liquid 1530. The first plate 1511 may be disposed at an upper side of the liquid 1530. In a modified embodiment, the first plate 1511 may be disposed at a lower side of the liquid 1530.

A thickness of the first plate 1511 on the optical axis OA may be smaller than a thickness of the second plate 1512 along the optical axis OA. The thickness of the first plate 1511 along the optical axis OA may be 40 to 80 μm. When the thickness of the first plate 1511 along the optical axis OA is less than 40 μm, the first plate 1511 may be easily damaged by impact during the test process, and when the thickness of the first plate 1511 on the optical axis OA is greater than 80 μm, deformation of the first plate 1511 may be insufficient. That is, when the thickness of the first plate 1511 along the optical axis OA is greater than 80 μm, all focus from macro focus to infinite focus may not be realized.

The first plate 1511 may be deformed according to the temperature of the liquid 1530. At this time, the temperature may be limited to a specific temperature section. The first plate 1511 may swell when the liquid 1530 is heated. An optical path of light passing through the first plate 1511 may be changed by the deformation of the first plate 1511. The focal length may be changed according to the deformation of the first plate 1511. Focusing may be performed by deformation of the first plate 1511. In a second embodiment of the present invention, the interface of the first plate 1511 may be used for focusing. In a second embodiment of the present invention, the interface portion of the first plate 1511 may be thinly operated to respond to the internal pressure. A portion of the first plate 1511 may be formed thinner than the periphery. As a modified embodiment, the entire first plate 1511 may be formed thinly to have the same thickness.

The first plate 1511 may comprise a first portion 1511-1 and a second portion 1511-2. The first plate 1511 may comprise a first portion 1511-1 through which the optical axis OA passes, and a second portion 1511-2 being extended from the outer circumference of the first portion 1511-1. At this time, the thickness of the first portion 1511-1 along the optical axis OA may be smaller than the thickness of the second portion 1511-2 in the corresponding direction. That is, the first plate 1511 may be thin at the center through which the optical axis OA passes, and thick at the periphery portion of the outer edge of the center, rather than being formed to have a uniform thickness in the entire section in the vertical direction. At this time, the central portion may be a lens unit. At least a portion of the first plate 1511 may comprise a lens unit for adjusting focus.

The case 1510 may comprise a second plate 1512. The second plate 1512 may be a lower plate. The second plate 1512 may be a bottom glass. The second plate 1512 may be disposed so that the optical axis OA passes therethrough. The second plate 1512 may be disposed at the other side of the liquid 1530. The second plate 1512 may be disposed at a lower side of the liquid 1530. The second plate 1512 may be thicker than the first plate 1511. The second plate 1512 may be thicker than the first portion 1511-1 of the first plate 1511. The second plate 1512 may be thinner than the second portion 1511-2 of the first plate 1511. The second plate 1512 may be formed to have the same thickness in all sections.

The case 1510 may comprise a third plate 1513. The third plate 1513 may be a core plate. The third plate 1513 may be a core glass. The third plate 1513 may be disposed between the first plate 1511 and the second plate 1512. The third plate 1513 may be formed as a separate member from the second plate 1512. In a modified embodiment, the third plate 1513 may be integrally formed with the second plate 1512.

The third plate 1513 may comprise a hole penetrating through the third plate 1513 along the optical axis OA direction in the central portion. A liquid 1530 may be disposed in the hole of the third plate 1513. The hole of the third plate 1513 may comprise an inner circumferential surface. The third plate 1513 may comprise an inclined surface 1513-1. The inner circumferential surface of the third plate 1513 may comprise an inclined surface 1513-1 whose diameter increases as it approaches the first plate 1511 from the lower end disposed on the second plate 1512. However, in a modified embodiment, the inclined surface 1513-1 may be omitted. That is, in a modified embodiment, the inner surface of the third plate 1513 may be disposed perpendicular to the second plate 1512.

The liquid lens 1500 may comprise a chamber 1520. In a second embodiment of the present invention, the chamber 1520 may be filled with a single liquid 1530. When two types of liquids are filled in the chamber 1520 as in the prior art, there is a problem that the two types of liquids are mixed by high temperature or ultrasonic waves, but the above-mentioned problem can be solved in a second embodiment of the present invention. That is, when the inside of the chamber 1520 is filled with a single liquid 1530 as in a second embodiment of the present invention, durability against temperature and ultrasonic waves is increased. Therefore, the liquid lens 1500 according to a second embodiment of the present invention can be used even at a high temperature of 80 degrees or more. The liquid lens 1500 according to a second embodiment of the present invention may be usable at low temperature and room temperature. The liquid lens 1500 according to a second embodiment of the present invention may be usable even at sub-zero temperatures. Meanwhile, in the prior art, a plurality of electrodes for applying a current to the conductive liquid are required, but in a second embodiment of the present invention, since only a positive (+) electrode and a negative (−) electrode for the heating member 1540 are required, the process can be simplified. Accordingly, cost competitiveness can be strengthened.

The liquid lens 1500 may comprise a liquid 1530. The liquid 1530 may be disposed in chamber 1520. In a second embodiment of the present invention, focusing may be performed by controlling the expansion of the liquid lens 1500 at the temperature of the liquid 1530. The liquid 1530 may be a conductive liquid. The liquid 1530 may be a non-conductive liquid. The liquid 1530 may be or comprise water. The liquid 1530 may increase in volume as the temperature increases. That is, when the liquid 1530 is heated by the heating member 1540, the liquid 1530 may be expanded. The volume of the liquid 1530 may increase linearly according to an increase in temperature in a predetermined temperature section.

The liquid lens 1500 may comprise a heating member 1540. The liquid lens 1500 may comprise an electrode. At this time, the electrode may perform a heater function. The liquid lens 1500 may comprise a heater electrode. The heating member 1540 may be disposed in the case 1510. The heating member 1540 may heat the liquid 1530. When the heating member 1540 heats the liquid 1530 the internal pressure of the liquid lens 1500 may be increased. At this time, the first plate 1511 may be inflated by the liquid 1530. The heating member 1540 may be disposed along the surface of the third plate 1513. A portion of the heating member 1540 may be disposed along the inclined surface 1513-1. At least a portion of the heating member 1540 may be disposed between the first plate 1511 and the third plate 1513. The heating member 1540 may be formed of a metal. The heating member 1540 may be formed of a conductive material. The heating member 1540 may comprise a resistor.

The heating member 1540 may comprise a plurality of terminals. The heating member 1540 may comprise a pair of terminals. The heating member 1540 may comprise a first terminal and a second terminal. The heating member 1540 may comprise a first terminal and a second terminal exposed to the outside. The heating member 1540 may comprise a positive (+) electrode and a negative (−) electrode. The electrode of the heating member 1540 may be connected to the printed circuit board through the connection portion 1450. The amount of current provided to the heating member 1540 may be controlled by the control unit 1024. However, the current provided to the heating member 1540 may be simply controlled to be on/off. Since the heating member 1540 requires only current control, in a second embodiment of the present invention, a driver IC 1025 capable of supplying only current may be used instead of the liquid lens dedicated driver IC 1025 that generates a potential difference. That is, the control unit 1024 may control the current applied to the heating member 1540. In a modified embodiment, the control unit 1024 may control the voltage applied to the heating member 1540. Furthermore, the control unit 1024 may control the current and voltage applied to the heating member 1540. In a second embodiment of the present invention, the control unit 1024 may detect the temperature of the heating member 1540. Through this, the temperature of the liquid 1530 in contact with the heating member 1540 can also be roughly detected.

Figure 19:
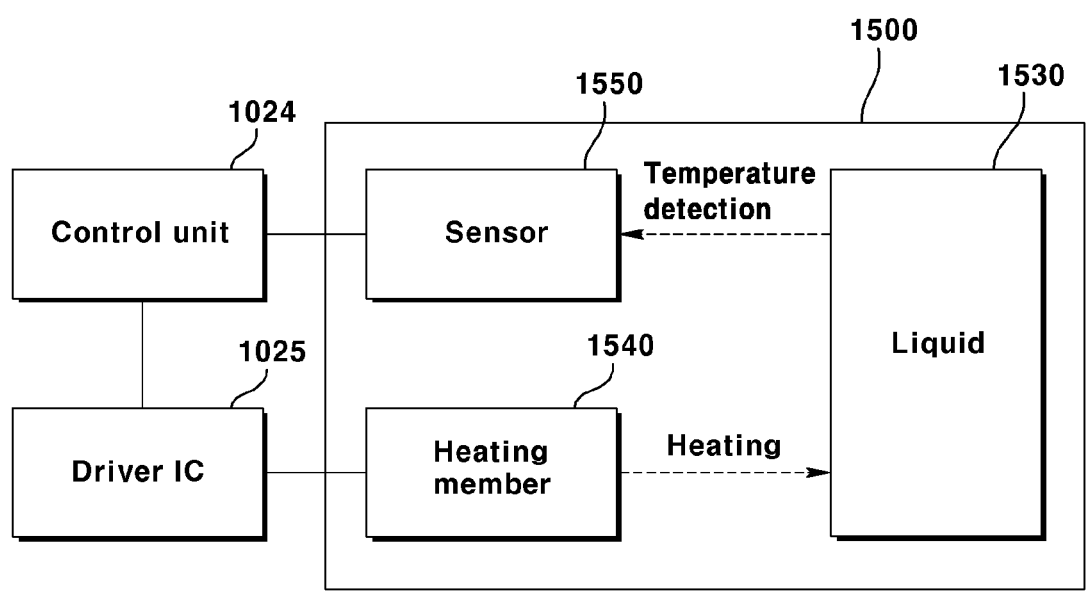
FIG. 19 is a configuration diagram illustrating a camera device according to a modified embodiment.

FIG. 19 is a configuration diagram illustrating a camera device according to a modified embodiment.

In a modified embodiment illustrated in FIG. 19, the liquid lens 1500 may comprise a sensor 1550. The sensor 1550 may be disposed in the case 1510. The sensor 1550 may detect the temperature of the liquid 1530. The sensor 1550 may be provided separately from the heating member 1540. The sensor 1550 may be in contact with the liquid 1530. The sensor 1550 may be connected to the control unit 1024. The sensor 1550 may detect the temperature of the liquid 1530 and transmit it to the control unit 1024, and the control unit 1024 may determine whether to further heat the liquid 1530 according to the temperature of the liquid 1530. That is, the liquid lens 1500 of the second embodiment of the present invention through the sensor 1550 may be feedback (feedback) controlled.

The sensor 1550 may comprise a plurality of terminals. The sensor 1550 may comprise a pair of terminals. The sensor 1550 may comprise a third terminal and a fourth terminal. The sensor 1550 may comprise a third terminal and a fourth terminal exposed to the outside. At this time, the third terminal and the fourth terminal of the sensor 1550 may be spaced apart from the first terminal and the second terminal of the heating member 1540. The third terminal may be a positive (+) terminal and the fourth terminal may be a negative (−) terminal. The third terminal may be a negative (−) terminal and the fourth terminal may be a positive (+) terminal.

The liquid lens 1500 according to a second embodiment of the present invention may comprise a feature of filling the chamber 1520 with a single liquid 1530. In this case, the effect of technology simplification and durability enhancement can be expected when compared to filling the chamber with a conductive liquid and a non-conductive liquid, that is, two types of liquid. In relation to technology simplification, there are advantages in that cost competitiveness is strengthened by simplifying the number of constituent materials/processes through the second embodiment of the present invention, and since current control is possible with existing technology, no new development cost for developing a driver IC 1025 is occurring. In relation to durability enhancement, through a second embodiment of the present invention, rather by taking advantage of the fact that liquid lenses are sensitive to temperature changes, since it is controlled by temperature, it has advantages in that additional control such as temperature compensation is unnecessary, it is possible to change the part that cannot be used above 80 degrees due to the characteristics of the material, strengthen the characteristic that restricts the use of ultrasonic waves, and simplify the structure of the camera device by reducing the number of terminals.

The third embodiment of the present invention is an embodiment in which the second embodiment is combined with the first embodiment. The liquid lens of the third embodiment may comprise a single liquid, first to third plates P1, P2, P3, first and second electrodes E1 and E2, and an insulation layer 146. In the third embodiment, the description of the configuration except for the liquid that is one configuration of the liquid lens 100 may be analogously applied to the description in the first embodiment. In addition, the description of the liquid of the liquid lens 100 in the third embodiment may be analogously applied to the description in the second embodiment.

The various embodiments described above may be combined with each other as long as they are not contradictory to each other without departing from the object of the present invention. In addition, if a component of one embodiment is not described in detail among the various embodiments described above, the description of the component having the same reference numeral of another embodiment may apply mutatis mutandis.

The embodiments have been described above, but these are only examples and do not limit the present invention, and those of ordinary skill in the art to which the present invention belongs will appreciate that various modifications and applications not exemplified above are possible without departing from the essential characteristics of the present embodiment. For example, each component specifically shown in the embodiment can be modified and implemented. And differences related to these modifications and applications should be construed as being comprised in the scope of the present invention defined in the appended claims.

The invention claimed is:

1. A liquid lens comprising:
   a case forming a chamber therein;
   a liquid disposed in the chamber; and
   a heating member disposed on the case and heating the liquid,
   wherein the case comprises a first plate through which an optical axis passes and disposed on one side of the liquid, a second plate through which the optical axis passes and disposed on an other side of the liquid, and a third plate disposed between the first plate and the second plate, wherein a thickness of the first plate at the optical axis is thinner than a thickness of the second plate at the optical axis, wherein the chamber is completely filled with a single liquid such that the single liquid contacts the first plate and the second plate prior to heating of the single liquid, wherein the heating member is configured to directly heat the liquid, wherein the first plate is configured to be swelled when the liquid is heated, wherein the liquid is contacted with the heating member when the first plate is swelled, wherein the first plate comprises a first portion through which the optical axis passes and a second portion extending from an outer periphery of the first portion, wherein a thickness of the first portion at the optical axis is thinner than a thickness of the second portion in a corresponding direction, wherein the thickness of the first portion of the first plate is uniform across all regions, wherein the third plate comprises an upper surface facing the second portion of the first plate and an inclined surface that inclines outwardly as the inclined surface approaches the first plate from a lower end disposed on the second plate, wherein the heating member comprises a first portion disposed on the inclined surface of the third plate and a second portion disposed on the upper surface of the third plate, wherein the first portion of the heating member and the second portion of the heating member form an obtuse angle, wherein the first portion of the heating member is overlapped with the first portion of the first plate in a direction of the optical axis, and wherein at least a portion of the second portion of the heating member is overlapped with the second portion of the first plate in the direction of the optical axis.

2. The liquid lens of claim 1, wherein the first plate is deformed according to a temperature of the liquid.

3. The liquid lens of claim 1, wherein the first portion of the heating member and the second plate define an obtuse angle.

4. The liquid lens of claim 3, wherein the first portion of the first plate is spaced apart from an upper surface of the second portion of the first plate and a lower surface of the second portion of the first plate.

5. The liquid lens of claim 3, wherein a portion of the liquid is disposed between the heating member and the second portion of the first plate in the direction of the optical axis.

6. The liquid lens of claim 1, wherein the thickness of the first plate at the optical axis is 40 to 80 µm.

7. The liquid lens of claim 1, wherein the heating member is disposed along a surface of the third plate, and wherein the heating member comprises a first terminal and a second terminal exposed outside.

8. The liquid lens of claim 7, wherein, in cross section, the heating member completely covers the inclined surface of the third plate.

9. The liquid lens of claim 7, further comprising a sensor disposed on the case and sensing a temperature of the liquid, wherein the sensor comprises a third terminal and a fourth terminal exposed outside.

10. The liquid lens of claim 7, wherein the second plate and the third plate are integrally formed.

11. A camera module comprising:
an image sensor,
the liquid lens of claim 1 disposed on the image sensor; and
a solid lens disposed between the liquid lens and the image sensor.

12. An optical apparatus comprising:
a main body;
the camera module of claim 11 disposed on the main body; and
a display portion disposed on the main body and configured to display an image photographed by the camera module.

13. A liquid lens comprising:
a case forming a chamber therein;
a liquid disposed in the chamber; and
a heating member disposed on the case and heating the liquid, wherein the case comprises a first plate through which an optical axis passes and disposed on one side of the liquid, a second plate through which the optical axis passes and disposed on an other side of the liquid, and a third plate disposed between the first plate and the second plate, wherein the first plate comprises a first portion through which the optical axis passes and a second portion extending from an outer periphery of the first portion, wherein a thickness of the first portion at the optical axis is thinner than a thickness of the second portion in a corresponding direction, wherein the chamber is completely filled with a single liquid, wherein the heating member is configured to directly heat the liquid, wherein the first portion of the first plate is configured to be swelled when the liquid is heated, wherein the liquid is contacted with the heating member when the first portion of the first plate is swelled, wherein the thickness of the first portion of the first plate is uniform across all regions, wherein the third plate comprises an upper surface facing the second portion of the first plate and an inclined surface that inclines outwardly as the inclined surface approaches the first plate from a lower end disposed on the second plate, wherein the heating member comprises a first portion disposed on the inclined surface of the third plate and a second portion disposed on the upper surface of the third plate, wherein the first portion of the heating member and the second portion of the heating member form an obtuse angle, wherein the first portion of the heating member is overlapped with the first portion of the first plate in a direction of the optical axis, and wherein at least a portion of the second portion of the heating member is overlapped with the second portion of the first plate in the direction of the optical axis.

14. The liquid lens of claim 13, wherein the first portion of the first plate is deformed according to a temperature of the liquid.

15. The liquid lens of claim 13, wherein the first portion of the first plate is spaced apart from an upper surface of the second portion of the first plate and a lower surface of the second portion of the first plate.

16. The liquid lens of claim 13, wherein a portion of the liquid is disposed between the heating member and the second portion of the first plate in the direction of the optical axis.

17. A liquid lens comprising:
a case forming a chamber therein;
a liquid disposed in the chamber; and
a heating member heating the liquid,
wherein the case comprises a first plate through which an optical axis passes and disposed on one side of the liquid, a second plate through which the optical axis passes and disposed on an other side of the liquid, and a third plate disposed between the first plate and the second plate,
wherein the first plate is deformed according to a temperature of the liquid,
wherein the chamber is completely filled with a single liquid,
wherein the heating member is configured to directly heat the liquid,
wherein the first plate is configured to be swelled when the liquid is heated,
wherein the liquid is contacted with the heating member when the first plate is swelled,
wherein the first plate comprises a first portion through which the optical axis passes and a second portion extending from an outer periphery of the first portion,
wherein a thickness of the first portion at the optical axis is thinner than a thickness of the second portion in a corresponding direction,
wherein the thickness of the first portion of the first plate is uniform across all regions,
wherein the third plate comprises an upper surface facing the second portion of the first plate and an inclined surface that inclines outwardly as the inclined surface approaches the first plate from a lower end disposed on the second plate,
wherein the heating member comprises a first portion disposed on the inclined surface of the third plate and a second portion disposed on the upper surface of the third plate,
wherein the first portion of the heating member and the second portion of the heating member form an obtuse angle, wherein the first portion of the heating member is overlapped with the first portion of the first plate in a direction of the optical axis, and
wherein at least a portion of the second portion of the heating member is overlapped with the second portion of the first plate in the direction of the optical axis.

* * * * *